(12) United States Patent
Hartley et al.

(10) Patent No.: US 10,606,660 B1
(45) Date of Patent: Mar. 31, 2020

(54) PLANNED CLOUD RESOURCE MANAGEMENT

(71) Applicant: Architecture Technology Corporation, Minneapolis, MN (US)

(72) Inventors: Timothy E. Hartley, Eden Prairie, MN (US); Ranga S. Ramanujan, Medina, MN (US)

( * ) Notice: Subject to any disclaimer, the term of this patent is extended or adjusted under 35 U.S.C. 154(b) by 100 days.

(21) Appl. No.: 15/583,692

(22) Filed: May 1, 2017

Related U.S. Application Data

(60) Provisional application No. 62/329,429, filed on Apr. 29, 2016.

(51) Int. Cl.
*H04L 29/08* (2006.01)
*H04L 12/24* (2006.01)
*G06F 9/50* (2006.01)
*G06F 9/455* (2018.01)

(52) U.S. Cl.
CPC ........ *G06F 9/5077* (2013.01); *G06F 9/45558* (2013.01); *G06F 9/5083* (2013.01); *H04L 67/1004* (2013.01); *G06F 2009/4557* (2013.01); *H04L 41/50* (2013.01)

(58) Field of Classification Search
CPC ...... H04L 67/10; H04L 67/14; H04L 41/5096
USPC ....................................................... 709/226
See application file for complete search history.

(56) References Cited

U.S. PATENT DOCUMENTS

| | | | |
|---|---|---|---|
| 8,706,798 B1 * | 4/2014 | Suchter | G06F 9/5038 709/202 |
| 8,812,627 B2 | 8/2014 | Donahue et al. | |
| 8,838,733 B2 | 9/2014 | Speckbacher et al. | |
| 9,292,060 B1 * | 3/2016 | Marr | G06F 1/3203 |
| 9,292,317 B2 | 3/2016 | Chen et al. | |
| 9,792,103 B2 | 10/2017 | Govindaraju et al. | |
| 2005/0114861 A1 * | 5/2005 | Mitchell | G06F 9/505 718/100 |
| 2006/0155630 A1 | 7/2006 | Sonnleithner et al. | |
| 2009/0307703 A1 * | 12/2009 | Archer | G06F 9/5027 718/104 |

(Continued)

OTHER PUBLICATIONS

"Apache CloudStack", Apache Software Foundation, Access from the Internet: https://cloudstack.apache.org/ on May 2, 2017, pp. 1-5.

(Continued)

*Primary Examiner* — June Y Sison
*Assistant Examiner* — Adam A Cooney
(74) *Attorney, Agent, or Firm* — Carlson, Caspers, Vandenburgh & Lindquist, P.A.

(57) ABSTRACT

One embodiment is directed to a method of managing hardware resources of a plurality of client nodes. The method includes providing a plan that indicates when to execute a plurality of applications and identifying one or more concurrent applications which are one or more of the plurality of applications that are scheduled to execute concurrently according to the plan. The method also includes determining which of the one or more concurrent applications to execute on which of a plurality of client nodes by maximizing a utility function that factors in aspects of each of one or more concurrent applications and the hardware resources of the plurality of client nodes. Respective client nodes of the plurality of client nodes are instructed to execute respective applications as determined.

22 Claims, 12 Drawing Sheets

(56) References Cited

U.S. PATENT DOCUMENTS

| | | | |
|---|---|---|---|
| 2011/0231899 A1* | 9/2011 | Pulier | G06F 9/45558 726/1 |
| 2014/0207505 A1 | 7/2014 | Ashley et al. | |
| 2015/0006726 A1 | 1/2015 | Yuan et al. | |
| 2015/0058459 A1 | 2/2015 | Amendjian et al. | |
| 2015/0134823 A1* | 5/2015 | Cucinotta | H04L 47/2425 709/226 |
| 2015/0372883 A1 | 12/2015 | Lam et al. | |
| 2015/0381578 A1 | 12/2015 | Thota et al. | |
| 2016/0019069 A1* | 1/2016 | Wei | G06F 9/4408 713/2 |
| 2016/0147550 A1 | 5/2016 | McWilliams et al. | |
| 2016/0197880 A1 | 7/2016 | Korman et al. | |
| 2017/0250977 A1 | 8/2017 | Turner et al. | |
| 2018/0060128 A1* | 3/2018 | Liu | G06F 9/4881 |

OTHER PUBLICATIONS

"Citrix Common Criteria Certification Information", CITRIX, Accessed from the Internet: https://www.citrix.com/about/legal/security-compliance/common-criteria.html on May 2, 2017, pp. 1-3.

"Emulab—Network, Emulation Testbed Home", Emulab, Access from the Internet: https://www.emulab.net/ on May 2, 2017, pp. 1-2.

"Red Hat and IBM Achieve Top Security Certification for KVM Hypervisor on Red Hat Enterprise Linux and IBM Servers", Red Hat, Inc., May 9, 2012, pp. 1-3.

"The Common Criteria", Accessed from the Internet: http://www.commoncriteriaportal.org on May 2, 2017, pp. 1-2.

"The Hypervisor (x86 & ARM)", Linux Foundation, Accessed from the Internet: https://www.xenproject.org/developers/teams/hypervisor.html on May 2, 2017, pp. 1-3.

"What is OpenStack?", Openstack, Accessed from the Internet: https://www.openstack.org/software/ on May 2, 2017, pp. 1-3.

"U.S. Government Protection Profile for Separation Kernels in Environments Requiring High Robustness Version 1.03", Information Assurance Directorate, Jun. 29, 2007, pp. 1-182.

U.S. Patent and Trademark Office, "Office Action", U.S. Appl. No. 15/583,711, dated Jan. 25, 2019, pp. 1-14.

U.S. Patent and Trademark Office, "Office Action", U.S. Appl. No. 15/583,711, dated Aug. 30, 2019, pp. 1-17.

U.S. Patent and Trademark Office, "Office Action", U.S. Appl. No. 15/583,711, dated Jan. 15, 2020, pp. 1-21.

* cited by examiner

| | | | | | |
|---|---|---|---|---|---|
| 302 | App | App #1 | App #2 | App #2 | App #1 |
| 304 | Trigger Event | 12:00 PM GMT | 1 Hour After Mgmt. Session Initiation | Receive Info: re: Car Detected | Receive Info: Car Detected & Receive info: Less than 50% Battery |
| 306 | Action | Add to Authorized List | Add to Authorized List | Set Priority at #1 | Remove from Authorized List |

FIG. 3

Profile of App #1

| Aspect | Value |
|---|---|
| Priority Level | 2 |
| Miniumum Hardware | Processor w/ 2 GB RAM |
| Miniumum Time | 1 hr. |
| Desired Hardware | DSP |
| Authorized Domains | 1 |
| Measured Hardware | 3 GB RAM Avg. |

Profile of App #2

| Aspect | Value |
|---|---|
| Priority Level | 3 |
| Miniumum Hardware | GPU |
| Miniumum Time | 20 min. |
| Desired Hardware | None |
| Authorized Domains | 1, 2 |
| Measured Hardware | 30 min. Execution Time Avg. |

FIG. 4

PLANNED CLOUD RESOURCE MANAGEMENT

RELATED APPLICATION

This application claims priority to U.S. Provisional Patent Application No. 62/329,429, filed on Apr. 29, 2016, entitled "SOFTWARE CLOUD MANAGEMENT", which is hereby incorporated herein by reference.

GOVERNMENT CONTRACT

This invention was made with government support under contract FA8650-14-M-1764 awarded by the United States Air Force. The government may have certain rights in the invention.

BACKGROUND

Cloud computing management software offers central control of multiple applications across multiple client nodes. Most existing cloud management software is configured for use in a cloud network that includes general purpose client nodes, wherein each client node has similar processing and data storage capabilities. Additionally, some cloud management solutions require the hardware on client nodes to support specific features. These make existing cloud management software difficult to integrate into pre-existing computing systems with diverse hardware resources that were not originally intended for cloud computing.

Existing cloud management software is also configured for use in environments with unlimited or elastic hardware resources. For example, many cloud management solutions operate in environments where if additional hardware resources are needed, the additional resources can be obtained by renting them from available hardware resource "farms" on the internet. Because of this, many cloud management solutions rigidly partition hardware resources among applications, such that once a hardware resource is assigned to an application it cannot be reassigned or shared with another application until the first application has completed. This leads to wasted hardware resources, as a hardware resource that is idle or underutilized by an application cannot be reassigned or shared with another application until the assigned application is complete. This is undesirable in some situation, such as when only a small amount of fixed hardware resources is available.

Most existing cloud management software is also relatively large, being configured for use in any of multiple environments. For example, existing open source cloud solutions for Linux support private cloud deployments and third-party hosting by innumerable service providers. Existing open source cloud solutions also have ecosystems in which independent open source projects fill gaps encountered by software developers wishing to deploy small and large projects in a cloud, providing for instance wizard-guided creation of a development environment in which the developer chooses the Linux distribution, database, middleware, development languages, and libraries, and a complete virtual machine environment is created suitable for development and immediate deployment to a private or third-party cloud. Aftermarket configuration management tools allow a developer to describe a runtime environment and its dependencies to ease recreation of an environment with newer versions of dependencies that may address bugs or security issues. Automated deployment tools allow creating cloud-deployable VM images from an existing Linux and aid in configuring multiple active nodes. All these features cause many existing cloud management solutions to be large and unsuitable for situations where a small, low processing cloud management solution is desired.

Existing cloud management software is also configured such that new applications are initiated by administrator interaction requesting initiation of the new application in the cloud. Thus, the cloud management software relies on administrator interaction throughout its cloud management operation.

These attributes, among others, make existing cloud management software unsuitable for operation in an environment with limited and diverse client nodes, in a situation with a reduced processing, data storage, and/or energy availability, or an environment in which a connection to an administrator may not always be present, requiring some amount of autonomous operation by the cloud management software.

Additionally, existing cloud management software is not configured to implement, within its managed cloud, multiple domains, which are segregated such that an application in one domain cannot concurrently share a hardware resource with an application in another domain. As such, existing cloud management software may not sufficiently segregate applications to allow different security level applications to be implemented within the same managed cloud.

BRIEF DESCRIPTION

Embodiments for a method of managing hardware resources of a plurality of client nodes are provided. The method includes providing a plan that indicates when to execute a plurality of applications and identifying one or more concurrent applications which are one or more of the plurality of applications that are scheduled to execute concurrently according to the plan. The method also includes determining which of the one or more concurrent applications to execute on which of a plurality of client nodes by maximizing a utility function that factors in aspects of each of one or more concurrent applications and the hardware resources of the plurality of client nodes. Respective client nodes of the plurality of client nodes are instructed to execute respective applications as determined.

Embodiments for a data storage entity are also provided. The data storage entity includes a processor readable medium having software stored thereon, wherein the software, when executed by one or more processing devices identifies one or more concurrent applications which are one or more of a plurality of applications that are scheduled to execute concurrently according to a plan. The plan that indicates when to execute the plurality of applications. The software also determines which of the one or more concurrent applications to execute on which of a plurality of client nodes by maximizing a utility function that factors in aspects of each of one or more concurrent applications and the hardware resources of the plurality of client nodes. The software also instructs respective client nodes of the plurality of client nodes to execute respective applications as determined.

Embodiments for a system are also provided. The system includes a plurality of client nodes, each client node having one or more processing devices coupled to one or more data storage devices having instructions thereon. The instructions on at least some of the client nodes implement a client manager when executed on the one or more processing devices of the corresponding client node. The system also includes a cloud manager node communicatively coupled to the plurality of client nodes. The cloud manager node includes one or more processing devices coupled to one or more data storage devices having instructions thereon. The instructions when executed on the one or more processing devices of the client node identify one or more concurrent applications which are one or more of a plurality of applications that are scheduled to execute concurrently according to a plan. The plan that indicates when to execute the plurality of applications. The instructions also determine which of the one or more concurrent applications to execute on which of the plurality of client nodes by maximizing a utility function that factors in aspects of each of one or more concurrent applications and the hardware resources of the plurality of client nodes. The instructions also instruct client managers of each client node to execute respective applications as determined.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 3 is a table illustrating an example plan implemented by a cloud manager of the network of FIG. 1;

FIG. 4 is two tables illustrating two example profiles of two different applications available to be assigned by the cloud manager of the network of FIG. 1;

DETAILED DESCRIPTION

Figure 1:
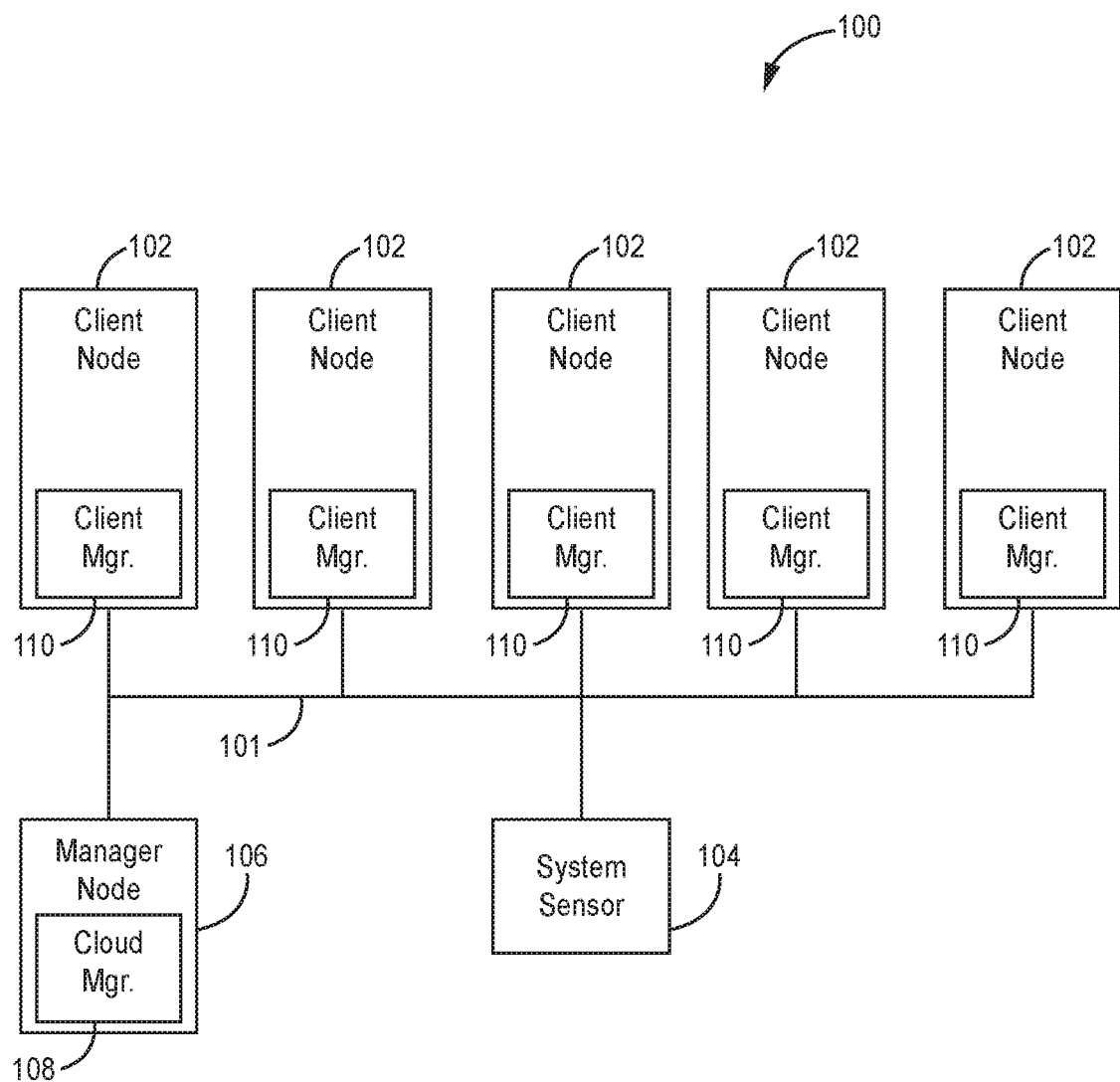
FIG. 1 is a block diagram of an example network including a plurality of nodes implementing planned cloud management.

FIG. 1 is a block diagram of an example network 100 including a plurality of nodes 102, 104, 106 communicatively coupled together via one or more network links 101. Each network link 101 of the network 100 can be a physical link implemented over one or more physical communication media (e.g., an Ethernet cable such as a cat-5E compliant cable) or can be a wireless link implemented using wireless signals. Additionally, one or more networking devices (not shown), such as a bridge, a hub, or a switch can be included in the network 100 to communicatively couple the nodes 102, 104, 106 together. For simplicity, single lines are shown connecting the nodes 102, 104, 106 together, however, one or more distinct network links 101 communicatively coupling each of the nodes 102, 104, 106 to a networking device or another node can be used as described below in the example portions 300, 500, 600, and 700 of network 100. Nodes 102, 104, 106 of network 100 include a plurality of client nodes 102, a cloud manager node 106, and one or more non-client nodes 104.

Each client node 102 is a distinct processing entity on which one or more applications can be executed. The client nodes 102 are controlled by a cloud manager 108, which instructs the client nodes 102 as to which of the plurality of applications is executed on which of the client nodes 102, and at which time the respective application is executed. The cloud manager 108 is a program that executes on one or more of the nodes 102, 104 on the network 100. The cloud manager 108 can execute on one or more of the client nodes 102 themselves, or, as in the example shown in FIG. 1, the cloud manager 108 can execute on a distinct cloud manager node 106. Each client node 102 includes a client manager 110, which is a program that executes on the client node 102 and controls application(s) executing on the client node 102. The client manager 110 communicates with the cloud manager 108 and controls which and how applications execute on the corresponding client node 102 in accordance with instructions from the cloud manager 108. As used herein the one or more non-client nodes 104 on the network 100 include any nodes that are neither managed by the cloud manager 108 or nor execute the cloud manager 108 itself.

Figure 2:
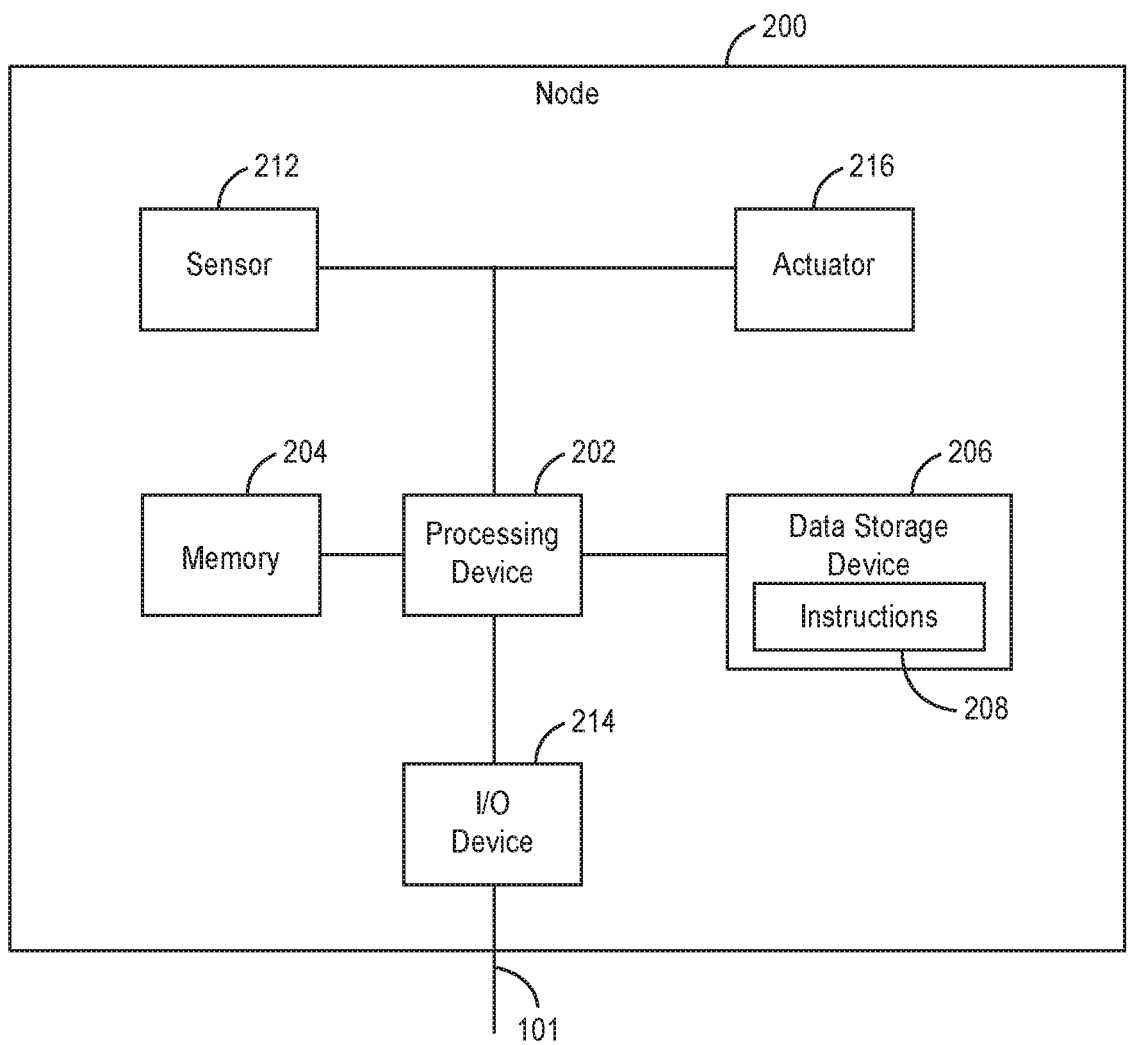
FIG. 2 is a block diagram of an example node of the network of FIG. 1.

FIG. 2 is a block diagram of an example node 200, which can be a client node 102, a non-client node 104, or a cloud manager node 106. Node 200 includes one or more processing devices 202 coupled to memory 204. The one or more processing devices 202 can include any one or more of a general-purpose processor (e.g., a central processing unit (CPU)) and a special-purpose processor (e.g., a digital signal processor (DSP) or graphics processing unit (GPU)). Memory 204 can include any suitable form of random access memory (RAM) now known or later developed, such as dynamic random access memory (DRAM), as well as other types of memory. Node 200 also includes one or more data storage mediums 206 coupled to the one or more processing devices 202. The one or more data storage mediums 206 can include any suitable computer readable medium providing non-volatile data storage including, but not limited to, magnetic media such as a hard disk drive (HDD), optical media such as a CD, DVD, or Blu-ray disk, and non-volatile electric media such as a solid-state drive (SSD), flash media, or EEPROM.

Node 200 includes instructions 208 stored or otherwise embodied on its respective one or more data storage mediums 206. The instructions 208, when executed by the one or more processing devices 202 of the node 200, cause the node 200 to perform the actions coded in the instructions.

The one or more processing devices 202, memory 204, and data storage mediums 206 are collectively referred to herein as the "hardware resources" of the client node 102. In addition to the one or more processing devices 202, memory 204, and data storage mediums 206, the hardware resources of a node 200 can include other hardware components on the node 200 such as one or more sensors 212, one or more input/output devices 214, one or more actuators 216 or other hardware component. In an example, at least one of the input/output devices 214 is a network interface (e.g., a wired interface (e.g., jack) or a wireless transceiver) through which communications to and from other nodes 200 in the network 100 occur.

Notably, each of the nodes 102, 104, 106 in network 100 is a distinct node 200. Accordingly, each node 102, 104, 106 includes a distinct one or more processing devices 202, memory 204, data storage mediums 206, instructions 208, input/output device 214, etc. Each node 102, 104, 106 can have the same or different hardware resources than other nodes 102, 104, 106 in the network 100. For example, a first client node 102 can include a quad-core processor along with a DSP, a second client node 102 can include a CPU and a GPU, while a third client node 102 can include a CPU with a large capacity data storage medium.

Referring back to FIG. 1, the instructions 208 on each client node 102 include the client manager 110. The instructions 208 on the cloud manager node 106 include the cloud manager 108, which manages the client nodes 102 by communicating with the client manager 110 of each client node 102 over the network 100. In embodiments where the cloud manager 108 is implemented in a client node 102, or across one or more client nodes 102, each such client node 102 includes in its instructions 208, the cloud manager 108 or its portion of the cloud manager 108.

The communications between the cloud manager 108 and the client managers 110 can take any form suitable for network communications. In an example, the network communications conform to an Ethernet standard (in accordance with an IEEE 802.3 standard) or a Wi-Fi standard (in accordance with an IEEE 802.11 standard). The communications between the cloud manager 108 and the client nodes 102 can include instructions from the cloud manager 108 to activate an application, halt an application, and/or modify execution of an application. The communications can also include information sent from the client nodes 102, such as information obtained by an application executing on a client node 102, requests from a client node 102, and information regarding the availability and/or use of hardware resources of the client nodes 102.

Referring now to FIG. 3, the cloud manager 108 follows a plan 300 to control which of a plurality of applications 302 execute on which client node 102 at which time. The plan 300 is a preconfigured schedule that indicates when to activate and/or halt each of the plurality of applications 302 being managed by the cloud manager 108. The plan 300 is based on information provided by an administrator (i.e., a human that administers the system), typically prior to initiation of management session. As used herein, a management session is a time period from the start of managing the plurality of applications 302 by following the plan 300 until an end of the plan is reached and the plurality of applications are no longer managed (e.g., all are halted) by the cloud manager 108.

Following the plan 300 allows the cloud manager 108 to operate autonomously for all or a portion of the management session. That is, by following the plan 300, the cloud manager 108 can activate and/or halt respective applications of the plurality of applications 302 on respective client nodes 102 without further administrator instruction. The plan 300 can cover any length of time. For example, the plan 300 can cover a fixed length of time (e.g., 1 hour, 1 day, 1 week) wherein the plan 300 is set to end the cloud management session at the end of the fixed length of time. In another example, the plan 300 can be set to continue indefinitely, wherein the plan 300 is set to continue until the management session is halted for some other reason, such as when halted by an administrator. In some examples, the plan 300 can be updated by an administrator after the cloud manager 108 has begun following the plan 300.

In an example, the plan 300 is organized into a plurality of tasks. Each task is associated with one or more applications 302 which are execute by the client nodes 102 to perform the task. A task may be an overall action to be accomplished, and each one or more applications 302 is a portion of the task that is implemented by a single client node 102. Accordingly, if a task uses hardware resources present on multiple client nodes 102, each client node 102 executes a distinct application of that task to execute its portion of the task. A task may use multiple client nodes 102, for example, if the task requires a specific set or amount of hardware resources that are not all present on any of the client node 102 individually, or not available for use by the task because some of the hardware resources of a client node 102 are assigned to other tasks.

The plan 300 includes one or more trigger events 304 tied to action(s) 306 the cloud manager 108 is to perform. A trigger event 306 is an event that can be observed by the cloud manager 108. Each task can be activated and deactivated based on one or more trigger events. That is, activating and deactivating a task are respective actions each tied to one or more trigger events in the plan. When a task is activated, the one or more applications associated with that task are added to an authorized application list. Likewise, when a task is deactivated, the one or more applications associated with that task are removed from the authorized application list. The list of authorized applications is the list of all applications that are authorized to execute on the client nodes 102. Once the one or more applications are on the authorized list, activating and halting of the one or more applications on a client node 102 is controlled by the cloud manager 108.

By following the plan, the cloud manager 108 identifies one or more applications that are scheduled to execute concurrently. The one or more applications that are scheduled to execute concurrently are the applications on the authorized list. The cloud manager 108 evaluates the list of authorized applications and the plurality of client nodes 102 to determine which of the authorized applications to execute on which of the plurality of client nodes 102. The cloud manager 108 can repeat these acts of identifying which one or more applications are scheduled to execute concurrently, and evaluating the list of authorized applications throughout the management session to dynamically manage which applications are assigned to which client nodes 102.

The cloud manager 108 can use a utility function to evaluate the list of authorized applications and the plurality of client nodes 102. The utility function factors in aspects of each of the one or more authorized applications, the tasks of the authorized applications, as well as aspects of the plurality of client nodes 102 to provide a metric to measure the utility of a given hypothetical assignment of applications on the client nodes 102. That is, the utility function provides a mathematical way to compare a first hypothetical assignment with one or more other hypothetical assignments, wherein each hypothetical assignment has different applications executing at different times and/or on different client nodes 102. The cloud manager 108 can maximize the utility function to determine which of the one or more authorized applications to execute on which of the plurality of client nodes 102.

The utility function can be a pre-configured function that factors in whichever of a plurality of different aspects are available. The aspects factored in by the utility function can be any aspect that can provide a differentiation in utility between two different implementations of applications on the client nodes 102. Example aspects include aspects of each respective application in the authorized applications. The aspects of an application are referred to herein collectively as the "profile" of the application. An example utility function can maximize a sum of yields, wherein each yield summed is a yield of an application calculated by the cloud manager 108 in a hypothetical implementation of the application according to a hypothetical application-client node 102 assignment for the plurality client nodes 102 and authorized applications.

FIG. 4 is two tables illustrating two example profiles 400, 401 of two different applications. Profile 400 corresponds to a first application and profile 401 corresponds to a second application. The profile 400, 401 of an application can include aspects 402 provided by an administrator (e.g., prior to executing of the cloud management session) and aspects 404 obtained by the cloud manager 102 (e.g., during executing of the cloud management session). Aspects 402 of an application provided by an administrator can include a priority level of the application relative to other applications, a minimum required hardware for the application, a minimum length of time required to complete the application, desired hardware resources of the application, general load, floating point load (to ensure compute-intense software is not provisioned on a low power CPU), operating system, sensor access requirements, library requirements, common client node assignment with other identified applications, and other things. Example hardware resources of an application that can be included in an application profile include the number and/or type of processing device(s) desired (e.g., DSP, GPU, GPGPU, CPU, FPGA), instruction set used (e.g., SIMD), memory type and/or size, data storage device type and/or size, network interface(s), and sensor(s). An aspect 404 of an application obtained by the cloud manager 102 can include a measured amount of hardware resources used (e.g., an average and/or peak use) by past use on a client node 102. The values in the profile of different applications can, and will likely, differ according to differences in the applications.

Other example aspects factored in by the utility function include aspects of each of the plurality of client nodes 102. Similar to the application aspects, aspects of a client node 102 are referred to herein as a profile of the client node 102. The profile of a client node 102 can include aspects provided by an administrator (e.g., prior to executing of a cloud management session) and aspects obtained by the cloud manager 108 (e.g., during executing of a cloud management session). An aspect of a client node 102 provided by an administrator can include the hardware resources of the client node 102. Aspects of a client node 102 obtained by the cloud manager 108 can include any hardware resources of the client node 102 that are currently unavailable for use by the cloud manager 108. A hardware resource may be currently unavailable, for example, because the hardware resource has malfunctioned or because the client node 102 has allocated the hardware resource to a task outside of the applications managed by the cloud manager 108.

In either case, the profile of a client node 102 can include any appropriate aspect such as hardware resources of the client node 102, unavailable hardware resources, client node name, IP address, operating system, domain, sensor system access, logging support, support for OpenCL, libraries (e.g., image processing library), and/or other aspects. Example hardware resources of a client node 102 that can be included in a client node profile include the number and/or type of processing device(s) of the client node (e.g., DSP, GPU, GPGPU, CPU, FPGA), instruction set used (e.g., SIMD), memory type and/or size, data storage device type and/or size, network interface(s), network capacity, and sensor(s). In an example, the cloud manager 108 maintains a profile for each client node 102 of the network 100. Maintaining a profile can include updating the profile during client node management based on changes to the client node 102.

In some examples, a task can have its own profile including aspects relating to the task. For example, a task profile may include an upper limit on a task's hardware resource usage. The cloud manager 108 can factor in such a task profile when assigning and controlling applications. Additional example aspects for a task, application, or client node profile are listed below with respect to FIG. 9.

The utility function can enable heterogenous client nodes 102 to be utilized in a manner that takes into account the specific hardware resources of each client node 102 by assigning applications to the client nodes 102 based on each client node's 102 respective hardware resources. This consideration of the distinct hardware resources of each client node 102, as well as the distinct aspects of each application is accomplished by incorporating the application profiles and client node profiles into the utility function. As discussed above, an application profile can include hardware specific aspects like a minimum required hardware resources and a desired hardware resource. Additionally, a client node profile can include aspects identifying the hardware resources of the client node 102. The utility function can be configured to try to match the hardware specific aspects of an application profile with corresponding hardware resources of a client node 102. Such a match can be preferred by the utility function by causing such a match to increase the overall utility output by the utility function. As should be understood, a utility function can balance many factors. As such, there may be instances when a higher utility is provided by not matching a hardware specific aspect of an application with a corresponding hardware resource, i.e., when other factors, such as a priority level of an application, outweigh the matching of the hardware resources. For example, in the absence of competing software applications, Node A, with substantial RAM and permanent storage might be allocated to Application 1, but if Application 2 requires a special-purpose coprocessor available only at Node A, Application 1 might instead be assigned by the Cloud Manager to Nodes B, C, and D, which have adequate RAM and together have equivalent data processing capacity from the view of Application 1. Taking into account the distinct hardware resources of each client nodes enables the cloud management system to operate in and take advantage of clouds with diverse nodes. As such, the cloud management system can be implemented in existing networks of nodes, which were originally designed without cloud computing in mind.

The utility function can also be configured to match other aspects of applications with client nodes 102, such as an allowed domain of an application with domain in which a client node 102 operates. Domains are discussed in further detail below. In any case, however, the utility function can factor in both required aspects and optional aspects. A required aspect is an aspect that must be matched between an application and a hardware resource in order for the application to be assigned to that hardware resource. Examples of required aspects are a required hardware resource or an allowed domain. Optional aspects are aspects that are desirable, but not necessary for matching between an application and a hardware resource. An example optional aspect is the desired hardware resource of an application.

The cloud manager 108 can include a planning module which an administrator interacts with to input the plan 300 to the cloud manager 108. The planning module can also enable an administrator to input aspects 402 of the applications and the client nodes 102. As mentioned above, other aspects 404 of the client nodes 102 can be obtained by the cloud manager 108 from the client nodes 102. These aspects 404 can be obtained via communication with the plurality of client nodes 102 as discussed in further detail below. An administrator can also sequentially relate applications by setting a trigger event that takes an action for a first application based on an item of information received from a second application, such as completion of a stage by the second application. The trigger event could be adding/removing the first application to/from the authorized application list or increasing/decreasing the priority of the first application to initiate or halt the first application based on the information from the second application.

In an example, the cloud manager 108 does not have an administrator interface that can be accessed during execution of a plan. In such an example, the cloud manager 108 can provide status information to an external device, but the cloud manager 108 is intended to operate autonomously during execution of a plan. The planning module is used by an administrator to provide information to the cloud manager 108 prior to executing the plan, which the cloud manager 108 then uses to execute the plan as discussed herein. In an alternative example, the cloud manager 108 does have an administrator interface accessible during execution of a plan. In such an alternative example, the plan can be updated by an administrator during execution.

The plan 300 can have any suitable format. Preferably the plan 300 includes one or more actions 306, and indicates when to initiate the one or more actions 306. As mentioned above, the plan 300 links each action 306 to one or more trigger events 304. The cloud manager 108 can follow the plan 300 by identifying the one or more trigger events 304 for each action 306 and initiating a respective action 306 in response to the one or more trigger events 304 occurring as instructed by the plan 300.

An example action 306 in the plan includes adding the applications of a task to the authorized list, removing the applications of a task from the authorized list, modifying execution of an application, and modifying an aspect of a task, application, or client node 102. Modifying an aspect of a task or application can include pausing the task or application, changing a priority of the task or application, adjusting hardware resource limits of the task or application, etc.

An example trigger event 304 includes a specific time (e.g., 12 P.M. GMT), a relative time (e.g., 1 hour after initiation of a cloud management session), or an item of information received by the cloud manager 108. The item of information received can be information obtained by an application executing on a client node 102. For example, during a cloud management session, a first application may be analyzing data from a sensor. The first application may be analyzing the data to try to identify a particular item, such as analyzing image data to detect a particular car. If the first application detects the car, the first application can be programmed to send a message to the cloud manager 108 indicating to the cloud manager 108 that the car has been identified. The reception of information indicating that the car has been detected can be a trigger event 304 in the plan 300 to add a second application to the authorized list. Accordingly, the cloud manager 108 can add the second plan to its list of authorized applications and activate the second application when appropriate according to the utility function. In another example, the item of information is a first application executing on a client node requesting additional hardware resources, requesting that another application be activated or halted, or requesting cloud storage. As should be understood, the scope of information that could be obtained by an application and used by the cloud manager 108 as a trigger event is unlimited.

Using such a plan, the cloud manager 108 can operate a cloud management session autonomously, or semi-autonomously. Once the plan 300 has been input into the cloud manager 108 and the cloud manager 108 has the information on the appropriate aspects of the one or more applications and the client nodes 102, the cloud manager 108 can follow the plan 300 to execute the cloud management session without further input from an administrator. Operating autonomously releases the administrator from having to be present to initiate the planned actions at the appropriate time. This can enable the cloud processing and cloud management session to be performed by a cloud of nodes that may not have constant, or any, communication with an administrator. For example, an unmanned vehicle (e.g., land, water, or air vehicle) that operates without constant, or any, network (e.g., Internet) connection (either by choice (stealth) or by virtue of its environment (remote, A2AD)) can implement a planned cloud management session as described herein without communication with an administrator. Examples of operation of such an unmanned vehicle operation is UAS/UAV operating in a remote environment, and a robot exploring in the ocean or in the arctic tundra for oil.

In an example, the plan can account for the entire operation of the vehicle, including the navigation and control of movement of the vehicle, as well as one or more analysis tasks on sensor data obtained by the vehicle. In an alternative example, the vehicle can operate partly independent of the plan while the plan implements a specific task with the client nodes of the vehicle. For example, the navigation and control of movement of the vehicle can be implemented by a system separate from the cloud manager, and the cloud manager can implement the plan to analyze data obtained by sensors on the vehicle. An example data analysis task includes analyzing, combining, and filtering sensor data in real-time or near real-time in order to reduce the quantity of data that is transmitted from the vehicle to a base device.

A planned cloud management session could also be used in a manned vehicle (e.g., an automobile) where the cloud management session manages the resources of client nodes 102 within the vehicle. Although a driver of vehicle would be present, the cloud management session could manage applications executing in the background to aid in driving the vehicle such that the driver would not directly activate or control the background applications. The nature of the applications and the tasks performed by the applications is unlimited. The cloud manager 108 and planned cloud management described herein can be used to manage resources of client nodes 102 in many different applications.

The planned cloud resource management described herein can be implemented in a vehicle or a non-vehicle with a network of multiple nodes to provide a solution that allows deploying independent software processes among shared client nodes. The planned cloud resource management can enable more efficient use of limited hardware resources by adaptively adjusting which applications are executed and by utilizing hardware resources that would otherwise be idle in a conventional fixed software situation. Also, by enabling use of otherwise idle hardware resources, more programs can be executed with a similar amount of hardware resources, and/or the amount of hardware resources can be less than in a fixed software situation. These benefits can aid in size, weight, and power (SWAP) considerations for uses in a vehicle. In an example, the cloud manager 108, client managers 110 and corresponding management 106 and client nodes 102 are, or operate on, real-time operating systems.

Example manned or unmanned vehicles in which the planned cloud management described herein can be implemented include an aircraft (e.g., airplane, jet, drone (UAS)), a land vehicle (e.g., automobile, semi-truck, construction equipment, motorcycle, ATV, snowmobile, remote controlled car), a watercraft (e.g., boat, ship, submarine), or a spacecraft (e.g., transport rocket, satellite).

Figure 5:
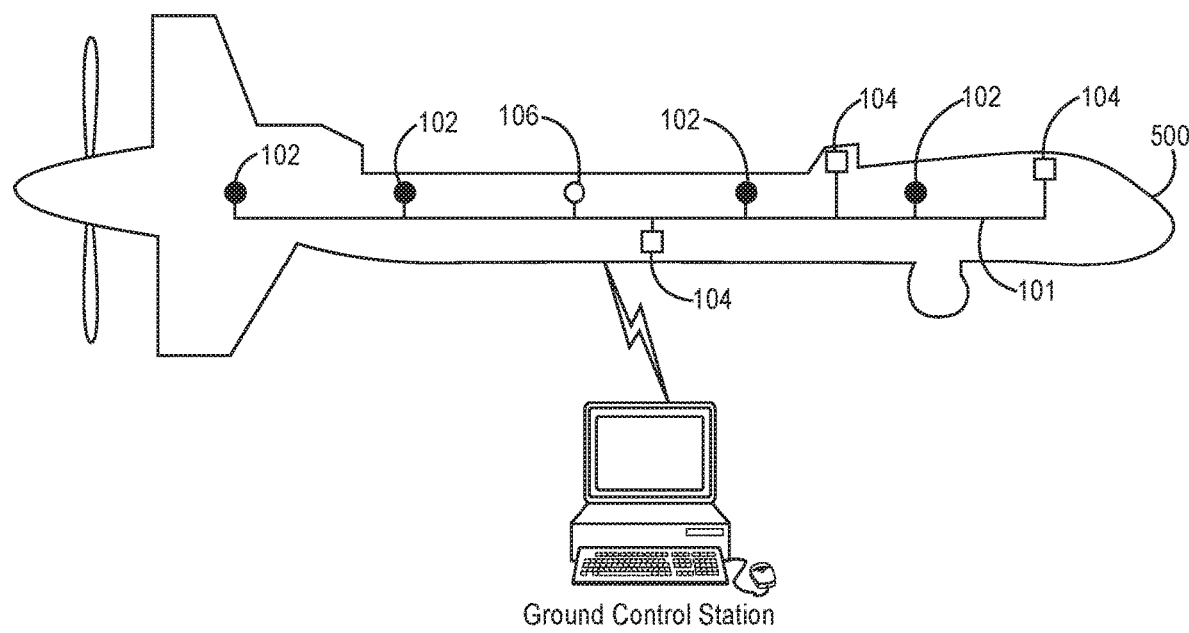
FIG. 5 is a block diagram of an example vehicle including the network of FIG. 1.

FIG. 5 is a block diagram of an example vehicle 500 having a plurality of nodes 102, 104, 106 implementing planned cloud hardware resource management. In this example, the vehicle 500 is a UAV performing surveillance over an area of interest. The plurality of nodes 102, 104, 106 include client nodes 102 having hardware resources available for assigning of one or more applications, other nodes 104 not available for assigning of one or more applications, and a cloud manager node 106. The plurality of nodes 102, 104, 106 are communicatively coupled together via a plurality of network links 101. In this example, the vehicle navigation and movement control are implemented outside of the planned cloud management. In an example, the cloud manager 108 implements a plan in order to identify vehicle matches in high-resolution video data available from a full motion video (FMV) sensor system. With on-board access to uncompressed data, a video processing task implemented in the plan can potentially perform more efficiently than a ground-based sensor exploitation algorithm could. The one or more applications assigned to the video processing task by the cloud manager 108 can selectively reduce the video frame rate and increase compression when the vehicle of interest is not present, and increase the ground-transmitted video quality when the vehicle of interest in a frame to provide higher fidelity information to ground-based sensor-exploitation algorithms or analysts and decision makers. If an overlapping task, to identify facial matches in the high-resolution video data, were to arise, the cloud manager 108 can assign a new one or more applications to appropriate client nodes 102. If the communication link with the ground station is temporarily lost or the link bandwidth temporarily degrades, the one or more applications executing on the plurality of nodes 102, 104, 106 can buffer frames of videos in cloud-located storage, and transmit the frames opportunistically, when the communication link is restored or improves. Low-quality frames which are uninformative and/or not useful can be dropped.

In addition to enabling operation in situations without constant administrator communication, the planned resource management described herein can also help further optimize the use of the resources of the client nodes 102. For example, since the cloud manager 108 does not need to wait for real-time authorization or instructions to perform an action included in the plan, the particular action can be accounted for by the utility function immediately in response to the corresponding trigger event(s). Moreover, the cloud manager 108 can take into account the information regarding upcoming action(s) in the plan when assigning resources.

As mentioned above, an action 304 implemented by the plan 300 can include modifying an aspect 402, 404 of an application. An example aspect 402, 404 so modified is a priority level of an application. For example, a second application may initially be set at a low priority level. The plan 300 may instruct the cloud manager 108 to set the priority at a higher level in response to one or more trigger events 304, such as receiving a particular item of information. Changing the priority level in such a way during implementation of a cloud management session can enable the hardware resources of the client nodes 102 to be allocated as desired to accomplish different tasks during different time periods of the plan. for example. Other aspects 402, 404 of an application can also be modified.

While following the plan 300, the cloud manager 108 can dynamically identify one or more authorized applications. That is, the cloud manager 108 can dynamically maintain the list of authorized applications throughout a cloud management session by adding and/or removing appropriate applications from the list when such an action 304 is instructed by the plan 300. The cloud manager 108 can also dynamically determine which of the authorized applications to execute on which of the client nodes 102 throughout a cloud management session. For example, each time a parameter of the utility function changes, the cloud manager 108 can determine whether a change to the application-client node assignments is needed to maximize the utility function. If such a change to the application-client node assignments is needed, the cloud manager 108 sends instructions to the client nodes 102 to effect the change. The parameters of the utility function include the aspects 402 of the applications and client nodes 102, as well as the list of authorized applications. For example, each time a new application is added to the list of authorized applications, the cloud manager 108 can determine whether a change to the application-client node assignments is needed to maximize the utility function. Many times, a change will be needed in order to activate the newly authorized application on the appropriate client node 102. Sometimes, however, the newly authorized application may not be activated immediately, or at all, because it is higher utility to use the hardware resources of the client nodes 102 for other applications. This might be the case when, for example, the newly authorized application is a low priority application and the hardware resources of the client node 102 are already fully utilized by higher priority applications. The cloud manager 108 can provide load balancing across the client nodes 102 and fault tolerance for the applications via its dynamic assignment of applications.

In some situations, a currently executing application may be halted by the cloud manager 108 prematurely, i.e., before that application completes on its own. This may occur, for example, if a newly authorized application is a higher priority than a currently executing application, and there are insufficient hardware resources available to execute the newly authorized application if the currently executing application continues executing. In such a situation, the cloud manager 108 sends an instruction to the appropriate client node(s) 102 executing the currently executing application, instructing the client node(s) 102 to halt the currently executing application and, if they are to be the client node(s) 102 executing the newly authorized application, instructing the client node(s) 102 to activate the newly authorized application. The cloud manager 108 can also provide fault tolerance by re-assigning an application to a different client node 102 if the currently assigned client node 102 fails or contention for hardware resources results in degraded performance. An application can be check-pointed by the cloud manager 108 or by the application itself such that if the application is re-assigned it can be started from the last check-pointed state. Check-pointed state information can be saved via the cloud storage service discussed below. In an example, to reduce the amount of check-pointed information, different applications can have different backup priority levels such that higher priority applications are backed up first with lower priority applications backed up later, if there is sufficient data storage or other hardware/network resources available.

The cloud manager 108 can also monitor the available hardware resources throughout the cloud management session to determine if the available hardware resources change. If a change in the available hardware resources occurs, for example, because of a hardware malfunction at a client node 102, the cloud manager 108 can determine if a change in application-client node assignment is needed and send appropriate instructions if so. In an example, an application on a client node 102 can monitor the hardware resources it's using or the hardware resources of the client node 102 generally (can also be performed by the client manager 110) and report information to the cloud manager 108 for use to dynamically determine available hardware resources. Accordingly, the cloud manager 108 can provide fault-tolerance by dynamically adjusting to hardware resources malfunctioning on a client node 102. Accordingly, if hardware failures or dynamic resource cause the requirements of an active high priority application to exceed the available cloud resources, resources can be taken from low priority applications and assigned for the high priority application.

Hardware resources may also become unavailable if a client node 102 leaves the network 100 or otherwise loses communication with the cloud manager 108. Accordingly, the cloud manager 108 can dynamically adjust to a client nodes 102 leaving and/or joining the plurality of client nodes 102. In an example, the network 100 includes one or more local area networks (LANs). In an implementation, each LAN in the network 100 operates in compliance with one or both of Ethernet (in accordance with an IEEE 802.3 standard) or Wi-Fi (in accordance with an IEEE 802.11 standard).

The instructions 208 on each client node 102 include the client manager 110 for managing one or more applications executing on the client node 102. In a first example, the software code necessary to implement a first application can be stored on the one or more data storage mediums 206 of the client node 102, e.g., by an administrator, prior to initiation of the cloud management session. Such pre-loaded software code is referred to herein as "pre-loaded" software code. In such a first example, the first application can be activated by sending an instruction from the cloud manager 108, receiving the instruction at the client manager 110 of the client node 102, and the client manager 110 initiating execution of the pre-loaded software code on the one or more data storage mediums 206.

In an alternative example, the software code for the first application can be absent from the client node 102 upon initiation of the cloud management session and the software code can be sent to the client node 102 by the cloud manager 108 during execution of the cloud management session and prior to activation of the first application on the client node 102. Software code in such an alternative non-pre-loaded example is referred to herein as "on-demand loaded" software code. On-demand loaded software code can initially be stored on cloud manager node 106, on another client node 102 (e.g., a client node 102 with abundant data storage capacity), or on a device outside of the network 100. The cloud manager 108 can, e.g., upon determining that the first application is to be execute on the client node 102, take the appropriate action to send the software code to the client node 102. The appropriate action can include sending the software code itself from the cloud manager node 106 to the client node 102, instructing another client node 102 storing the software code to send the software code to the client node 102, or sending an appropriate message to an entity outside the network 100 to enable the entity to send the software code to the client node 102. The applications execute on a client node 102 can be any mix of pre-loaded software code and on-demand software code including all pre-loaded or all on-demand software code.

Figure 6A:
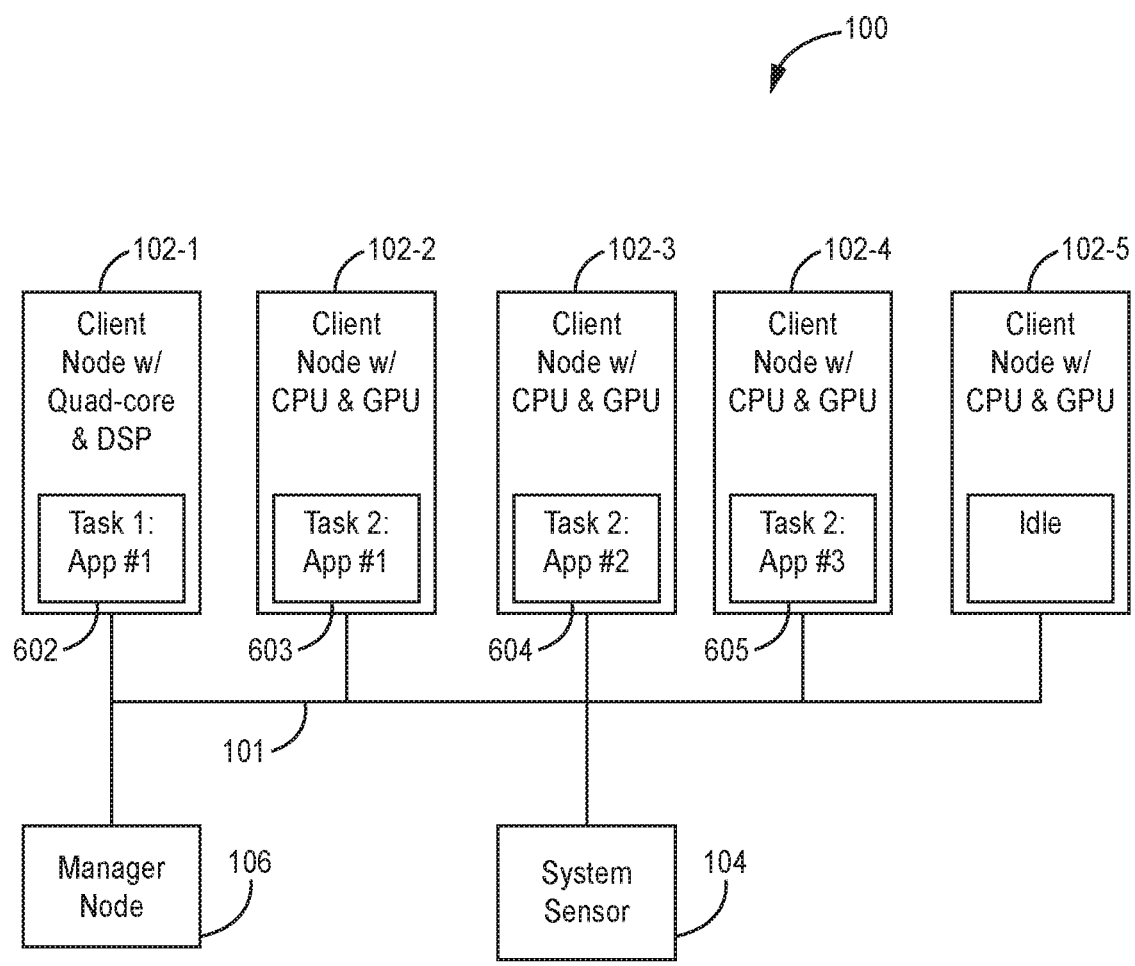
FIG. 6A is a block diagram illustrating example applications executing on the nodes of the network of FIG. 1 during a first time period.
Figure 6B:
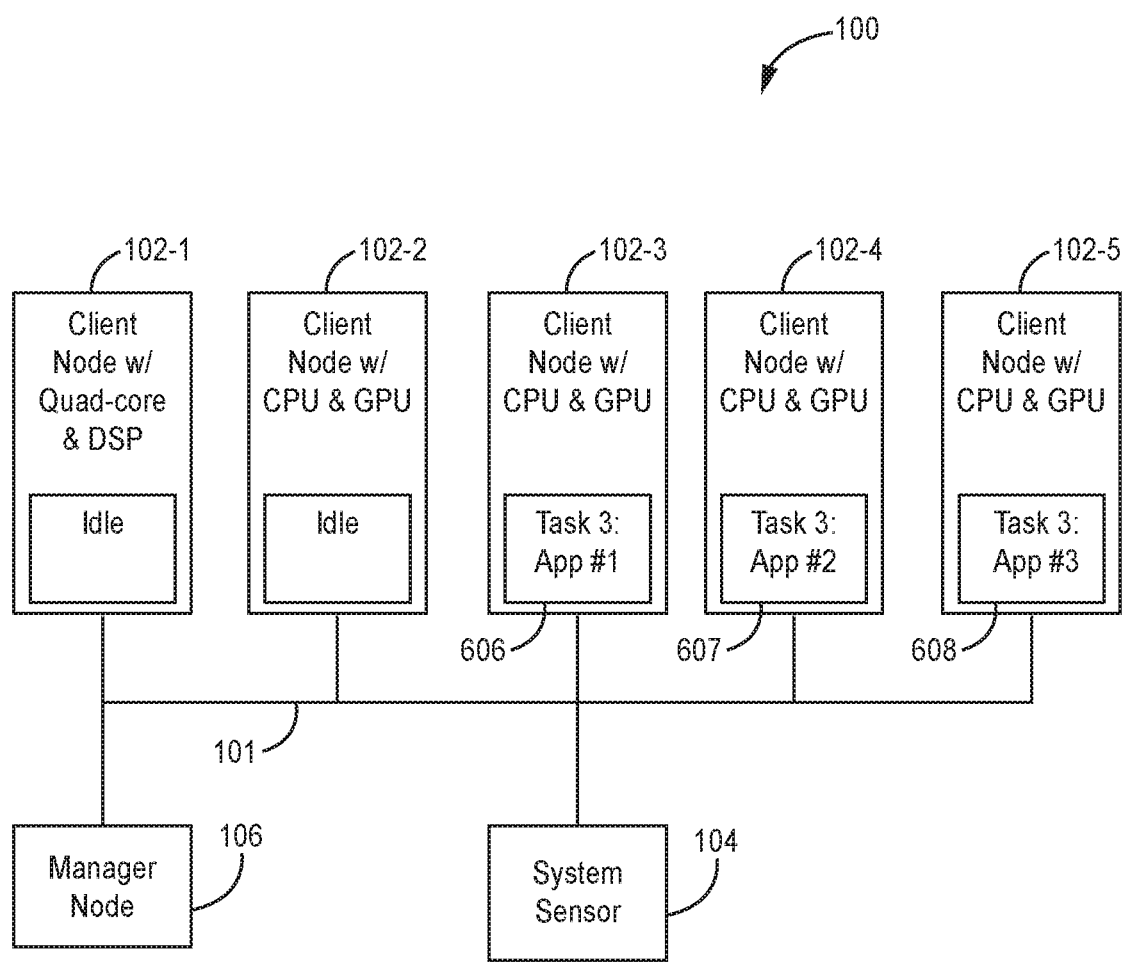
FIG. 6B is a block diagram illustrating example applications executing on the nodes of the network of FIG. 1 during a second time period.

FIGS. 6A and 6B are block diagrams of network 100 illustrating example applications executing on the client nodes 102 during a first time period (FIG. 6A) and a second time period (FIG. 6B) of a cloud management session. Each client node 102 also executes a client manager 110, and the manager node 106 executes the cloud manager 108, neither of which are shown in these figures.

FIG. 6A illustrates the network 100 during a first time period. During the first time period the cloud manager 108 executing on the manager node 106 instructs a first client node 102-1 to execute an application 602 for a first task, a second client node 102-2 to execute a first application 603 for a second task, a third client node 102-3 to execute a second application 604 for the second task, and fourth client node 102-4 to execute a third application 605 for the second task. A fifth client node 102-5 is idle during the first time period.

FIG. 6B illustrates the network 100 during a second time period. During the second time period the cloud manager 108 instructs the third client node 102-3 to execute a first application 606 for a third task, the fourth client node 102-4 to execute a second application 607 for the third task, and a fifth client node 102-5 to execute a third application 608 for the third task. The first and second client nodes 102-1, 102-2 are idle during the second time period.

Using as an example a surveillance UAV including the network shown in FIGS. 6A & 6B, during a first time period of a plan (shown in FIG. 6A), four processors are needed by two competing tasks searching for a red car. The first task uses a brute force approach to finding the red car, processing a single frame at a time, requiring a fast CPU with a DSP coprocessor. The second task uses nonlinear image processing considering multiple frames and is designed to take advantage of multi-node scatter gather and the parallel processing capabilities of a GPU. After the red car is located, the primary task changes during a second time period (shown in FIG. 6B). During the second time period the primary task becomes tracking the target, which involves different applications, but which the cloud manager 108 is able to re-use client nodes no longer used by the two searching tasks during the first time period. Unused client nodes may be put into low power states or assigned applications for background tasks like data compression or equipment status monitoring for reporting to the ground.

The planning module can enable an administrator to define a plurality of distinct stages (legs) of a plan. The priority level of one or more of the applications can be set on a per stage basis so, for example, an application can have a first priority level during a first stage and a second priority level during a second stage. The stages can start and end based on one or more trigger events. Transitions between a stage can also be effectuated in response to a command received at the cloud manager 108 from an administrator or higher-level external system. Prior to executing a plan, the cloud manager 108 can preplan the cloud-node assignments for all or a portion (e.g., one or more stages) of the plan based on the available information at that time. The assignments can be modified later based on dynamically arising trigger events.

The cloud management system described herein can also implement multiple application domains across the plurality of nodes. An application domain (also referred to herein as simply a "domain") is an access controlled partitioning of hardware resources and data of the network 100. This includes access controller partitioning of the client nodes 102 and access controlled data flow through the network 100. That is, the access for an application to hardware resources and data in the network 100 is restricted based on the domain that the application is operating in. Each application is only allowed to access hardware resources and data that is in its domain. The application cannot access hardware resource or data that is in other domains. The client nodes 102, networking devices, and the physical set-up of the network 100 cooperate to provide the access control of the hardware to achieve distinct domains in the network 100. In some examples, access to hardware resources, network devices, and/or network links can be time divided between domains, such that an application in a first domain can have access to a first hardware resource at a first time, but no access to the first hardware resource at a second time. In any case, each domain in the network 100 is a set of hardware resources that is distinct at any given time from the hardware resources of other domains. Some hardware resources may only operate in a single domain throughout a cloud management session. Other hardware resources can operate in a first domain at a first time and in a second domain at a second time, but the hardware and software resources can only operate in a single domain at a time. More detail regarding example domains and example configurations of client nodes 102, network devices, and the network 100 generally to achieve distinct domains is provided U.S. patent application Ser. No. 15/583,711, titled "Multi-Domain Cloud Computing", filed on even date herewith, which is hereby incorporated herein by reference.

One or more allowed domains for an application and one or more allowed domains for a client node 102 can be provided to the cloud manager 108 from an administrator via the planning module discussed above. The cloud manager 108 maintains information regarding the allowed domain(s) of an application and the allowed domain(s) of a client node 102 in the respective profile of the application or client node 102.

The allowed domain(s) for an application and client node 102 are factored into the utility function. In an example, the allowed domain is an aspect that is required to match by the utility function. That is, the utility function requires that any application assigned to a client node 102 is allowed to operate in a domain that the hardware resource is or will be operating in while the client node 102 is executing the application.

The domains implemented by the cloud manager 108 can be used for any suitable purpose. An example purpose for the domains is to ensure respective sets of information remain distinct from one another. For example, in a medical setting is may be desired to maintain patient medical information separate from other information, such as billing and management information. Another example is in a passenger vehicle (e.g., car, aircraft, etc.), where it is desirable to keep passenger data (e.g., passenger Internet traffic) separate from data used to operate the vehicle (e.g., pilot, vehicle sensor, and navigation data).

Another purpose for multiple domains is to implement multiple security classifications of data in the same cloud network. For example, it may be desirable to keep secret data separate from secure but unclassified (SBU) data and ensure that SBU applications do not have access to secret data or other secret applications. Accordingly, a first domain could be used for secret data and a second domain for secure, but unclassified data.

Figure 7:
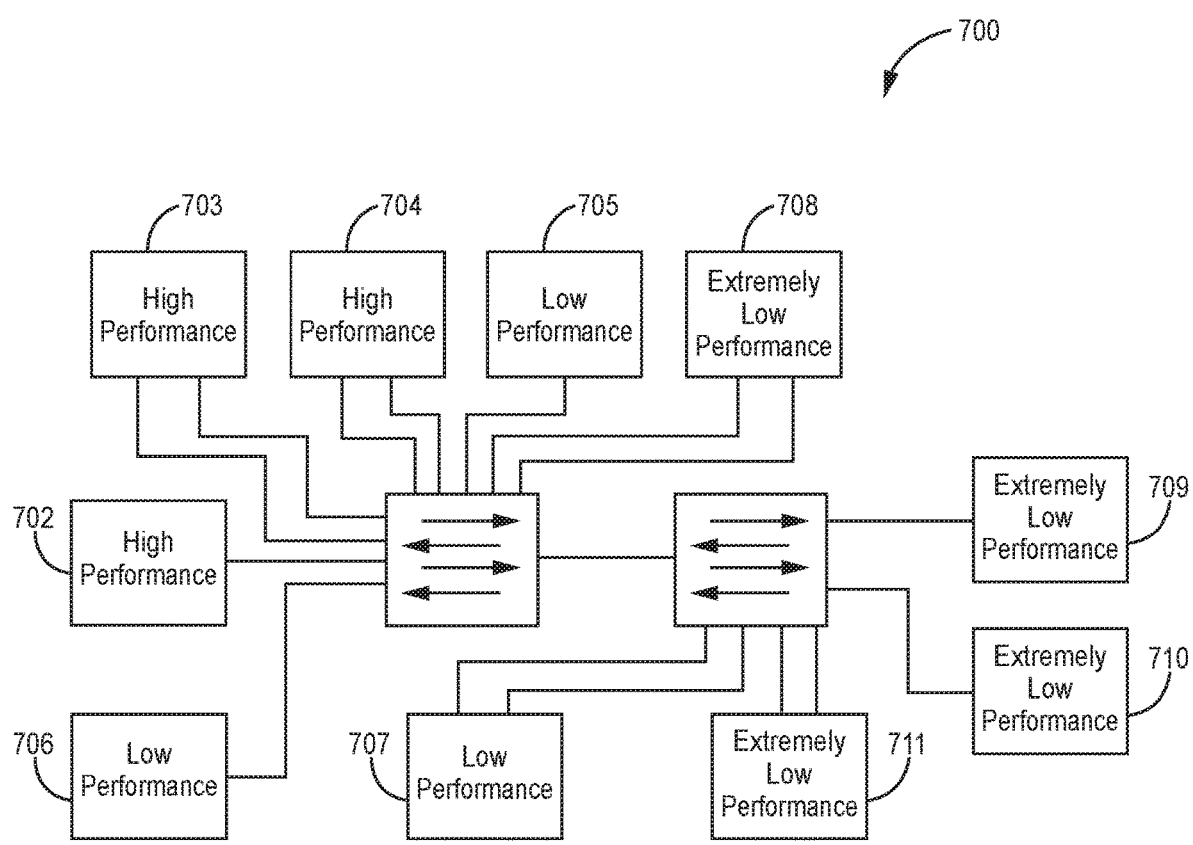
FIG. 7 is a block diagram of another example network implementing planned cloud management.

FIG. 7 is a block diagram of an example network 700 implementing planned cloud management as described herein. Network 700 includes a plurality of heterogeneous nodes 702-711. In an example, the client nodes 702-711 are divided into a plurality of hardware characteristic groups, in which client nodes 702-711 are grouped based on their hardware resources. In this example, three hardware characteristic groups are used. The first group is a high-performance group and includes nodes 702-704. The second group is a low performance group includes nodes 705-707. The third group is an extremely low performance group and includes nodes 708-711. The group assignment of the nodes 702-711 can be set by an administrator via the planning module or can be determined by the cloud manager 108 through communication with the client nodes 702-711. The group assignment of each node 702-711 can be included the profile of that group and can be used as a factor in the utility function when assigning an application to a client node 702-711. Other methods of grouping client nodes can also be used such as available data storage capacity (e.g., hard drive space available).

Figure 8:
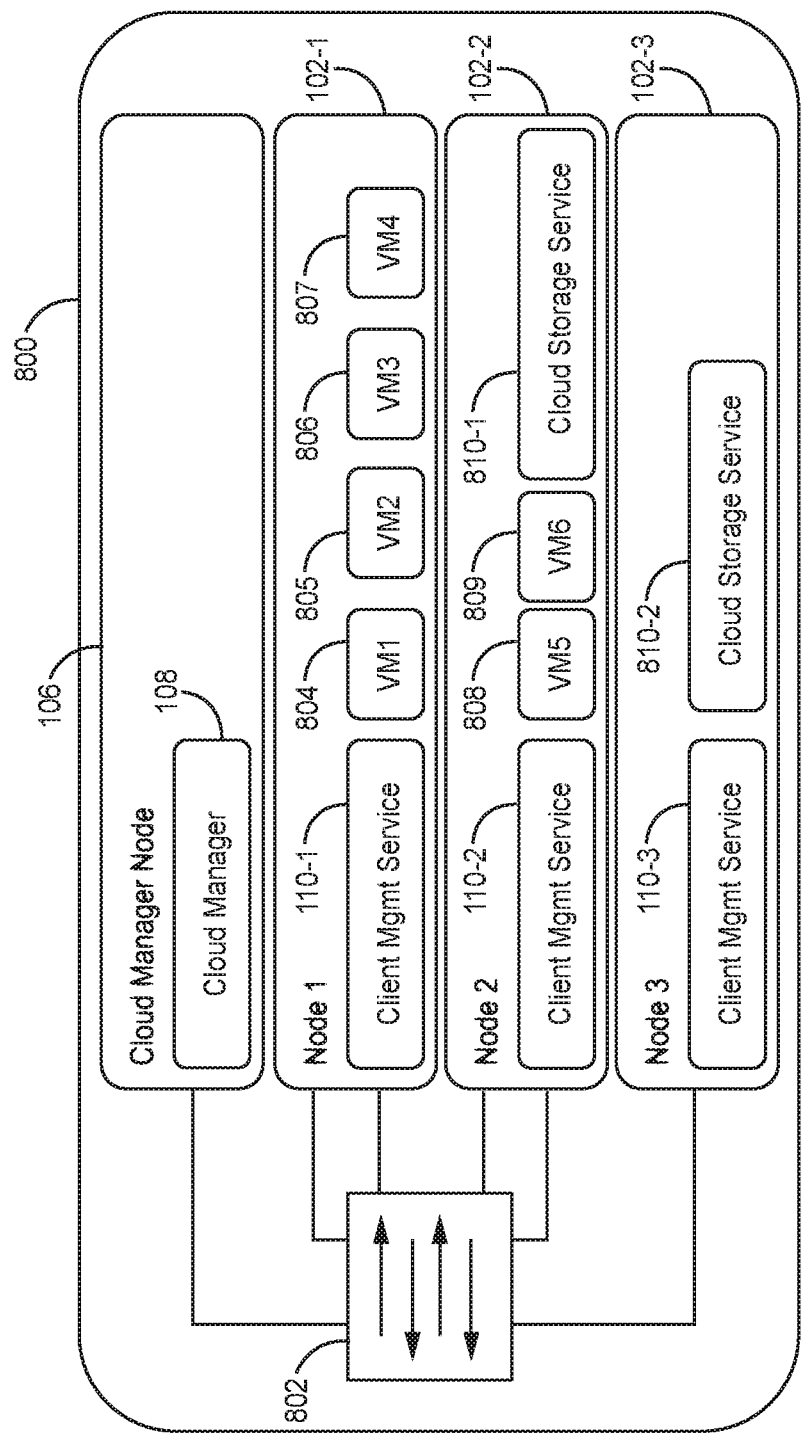
FIG. 8 is a block diagram of yet another example network implementing planned cloud management.

FIG. 8 is a block diagram of an example network 800 implementing a cloud management system as described herein. Network 800 includes a cloud manager node 106 executing a cloud manager 108. Network 800 also includes three client nodes 102-1, 102-2, 102-3, each executing a respective client manager 110-1, 110-2, 110-3. A networking device 802 communicatively couples the cloud manager node 106 and the client nodes 102-1, 102-2, 102-3 together.

The client manager 110 can configure applications to assign physical to virtual bridges for the applications, enforce domains, provide limits on hardware access, and upper limits on processor, memory, and/or data storage usage. The client manager 110 can intermediate between the cloud manager 108 and the applications on the client node 102, forwarding requests from the applications to the cloud manager 108 and receiving replies from the cloud manager 108 and forwarding them to the applications. Intermediation can reduce the need to configure the applications to find and interact with the cloud manager 108 directly. This intermediation can also provide security by having the client manager 110 encrypt/decrypt communications to/from the cloud manager 108. Using the client manager 110 for this can be advantageous because a single signed and trusted application can perform this encryption/decryption.

The client manager 110 can include an application facing API for communications with the applications. In an example, the application facing API can be a network service attached to a specially designated local IP address and port that is not routed or bridged to any physical network address. This allows the same local IP address to be used by every client manager instantiation for local communication without risk of conflict with other services, and allows applications to open a connection to the local client manager 110 without having to discover which host the application is on.

Client nodes 102-1, 102-2, 102-3 and client managers 110 can execute and control execution of their corresponding applications in any suitable manner. In a first example, a hypervisor executes on a client node 102 to provide access control partitioning of the hardware resources of the client node 102, among other things. The client manager 110 executes within the hypervisor and communicates with the hypervisor to control the hypervisor. The hypervisor to implement a virtual machine for each application assigned to execute on the corresponding client node 102. In examples in which multiple domains are implemented, the client manager 110 can also instruct the hypervisor as to what access each virtual machine has to the hardware resources of the client node 102. That is, the client manager 110 can control, based on instructions from the cloud manager 108, which virtual machines are in which domain and provide access to the hardware resources (via instructions to the hypervisor) that effectuate the domains on the client node 102. The hypervisor can be a native (Type-1) hypervisor that executes directly on the hardware of the client node 102 or a hosted (Type-2) hypervisor that executes within an operating system on the client node 102.

In another example, a separation kernel executes on a client node 102 to provide access control partitioning of the hardware resources of the client node 102, among other things. The client manager 110 executes on the separation kernel and communicates with the separation kernel to control the separation kernel. The client manager 110 instructs the separation kernel to implement a container for each application assigned to execute on the corresponding client node 102. The client manager 110 can control the separation kernel in a similar manner to the control of the hypervisor example discussed above.

The hypervisor or separation kernel can implement a distinct virtual machine (VM) 804-809 or container for each application executing on the client node 102-1, 102-2, 102-3. The hypervisor or separation kernel can control access of the virtual machines/containers to the hardware resources of the client node 102-1, 102-2, 102-3 in accordance with instructions from the client manager 110. Any appropriate virtualization/container solution can be used to implement virtual machines/containers on the client nodes 102, including but not limited to Linux containers (LXC) (e.g., an unprivileged container), Xen, kernel-based virtual machine (KVM), or a separation kernel protection profile (SKPP).

In other examples, a client node 102-1, 102-2, 102-3 can expose a service-oriented network facing application programming interface (API) execute as an administrator-level application on an operating system of the client node 102-1, 102-2, 102-3. The service-oriented API approach may be desirable for retrofit situations where reconfiguration of a client node 102-1, 102-2, 102-3 to include hypervisor or container support is undesirable or impossible due to incompatibility. In the service-oriented API approach each application can be a process executing directly on a host operating system of the client node 102-1, 102-2, 102-3.

In the example shown in FIG. 8, each application managed by the cloud manager 108 is executed on a client node 102-1, 102-2, 102-3 in a distinct virtual machine on the client node 102-1, 102-2, 102-3. The first client node 102-1 is executing four applications 804-807, the second client node 102-2 is executing two applications 808, 809, and the third client node 102-3 is not executing any applications. Different applications can cooperate with one another, both within a client node or across different client nodes, to accomplish a task.

In an example, the planning module of the cloud manager 108 can provide an interface to create and test virtual machines/containers for applications to create a description of the deployed platform requirements. One aspect of this includes providing templates so a virtual machine or container is prepared with libraries or services appropriate to a class of problems. Another aspect could include launching a local environment where the developer can program or test an application. A third aspect can include using template information and application code to automatically generate virtual machines or containers for multiple platforms available across the client nodes 102. The planning module can also provide an interface to create and validate a description of a client node hardware resources. The planning module can also provide an interface to create a base network configuration that indicates all client nodes and network interface connections. The planning module can also provide an interface to create tasks and the plan as discussed above.

In an example, the cloud manager 108 can use configuration files (e.g., in XML format) instead of one or more of the administrator interfaces discussed above. The configuration files can be tailored to one or more client nodes 102 and/or applications. In an example, the planning module can allow multiple administrators to provide distinct information for an application, task, or cloud profile, or the plan, and the cloud manager 108 can merge the distinct information to arrive at application assignment and control decisions.

In an example, one or more of the client nodes 102-1, 102-2, 102-3 can implement one or more standardized, shareable, manageable services. An example of such a service is a cloud storage service 810 (810-1, 810-2). The cloud storage service 810 can be a network-accessible service used for abstracting the location of data storage (persistent) among the client nodes 102-1, 102-2, 102-3. The cloud manager 108 can implement a cloud storage request API to allow applications to discover and be assigned a cloud storage service relationship.

A cloud storage service 810 can implement a simple remote method invocation oriented API. This API can, for example, have four methods: one each of opening, reading, writing, and closing a file. The cloud storage service 810 can have a distinct API for the use of the cloud manager 108 to monitor, check configuration, and configure domain and client manager 110 relationships.

The cloud storage service 810 can protect access to files based on task or domain, for example. The cloud manager 108 can assign each instance of cloud storage service 110 to a single domain. The cloud manager 108 can consider the application's domain when responding to a service discovery request. By limiting access to a cloud storage service 810 to applications in a common domain, the cloud manager 108 ensures data cannot leak across domains. In an example, the cloud storage service 810 handles authentication and key management to prevent unauthorized access with unique keys generated for each domain, and optionally, for each task or application.

Figure 9:
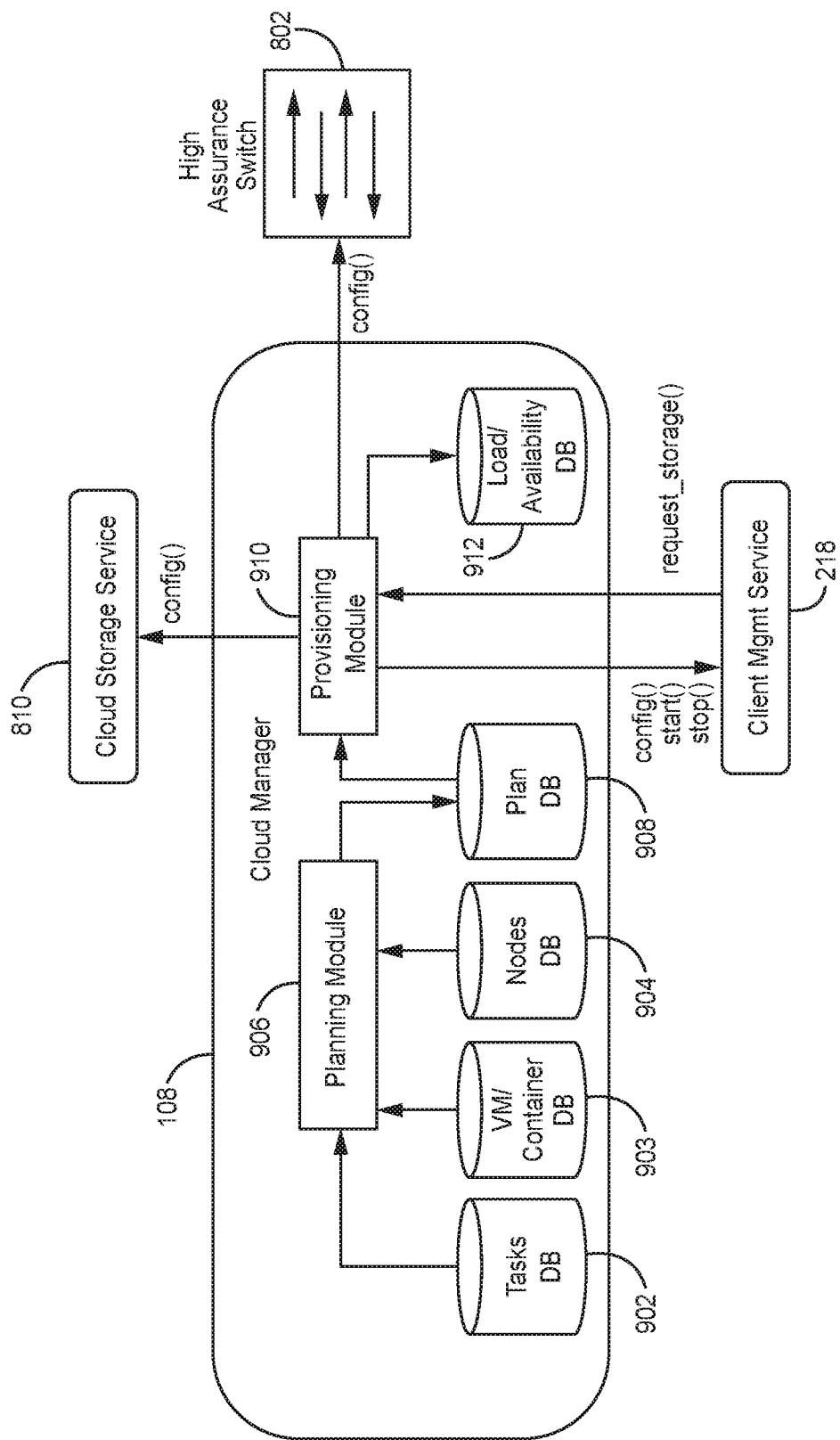
FIG. 9 is a block diagram of an example cloud manager in communication with a client manager, cloud storage service and a networking device.

FIG. 9 is a block diagram of an example cloud manager 108 in communication with a client manager 110, cloud storage service 810, and a networking device 802. The cloud manager 108 can include a task database 902 that describes the tasks of the plan by including a profile for each task. A task profile can include a task name, a task start trigger, a task end trigger, and a list of the one or more applications to execute for the task. The task database 902 can also include the application profiles. An application profile can include the virtual machine(s) or container(s) used to execute the application, the name of the application, the required hardware resources, the desired hardware resources, the operating system, libraries, and domain among other aspects. The cloud manager 108 can also include a virtual machine and/or container profile for each virtual machine or container to implement the applications of the task. A virtual machine or container profile can include any or all of the aspects discussed herein for an application, such as the name of the virtual machine/container, the required hardware resources, the desired hardware resources, the operating system, libraries, domain, and the weight (speed and memory) among other aspects. The cloud manager 108 can factor in a desire to spread heavyweight virtual machines/containers across the client nodes 102. In an example, the desired hardware resources are an estimate of the processor, memory, and data storage use (e.g., average) of the application.

Table 1 lists example aspects that can be included in a task/application or cloud profile.

TABLE 1

| \multicolumn{3}{c}{Client node and Task Properties} | | |
|---|---|---|
| Property Family | Property | Sub Properties |
| Core | Processor | Family |
| | | Processor flags (e.g. SSE3) |
| | Multicore | |
| | High-performance | |
| | Large memory | |
| Operating environment | Separation kernel | Host OS |
| | | Guest OSes supported |
| | Virtualization separation | Host OS |
| | | Guest OSes supported |
| | Process separation | OS |
| | Process load technique | Local OS image, remote OS image, executable image, package |
| | Libraries | |

TABLE 1-continued

| \multicolumn{3}{c}{Client node and Task Properties} | | |
|---|---|---|
| Property Family | Property | Sub Properties |
| Special Hardware | DSP | Type |
| | | Library |
| | GPGPU | Family |
| | | Number of cells |
| | | OpenCL version |
| | | CUDA version |
| | FPGA | Family |
| | | Type |
| | | OpenCL on FPGA |
| Other | Enclave Connectivity | Sensor Connectivity |
| | | Output connectivity |
| | | Collaborative connectivity (high-speed comm to other client nodes) |
| | | Off-UAS comm |
| | Storage/logging | Size |
| | | Persistent |
| | | Removable |
| | | Data at Rest Encryption |

The following tables document some of the possibilities for property values in the profiles, and include type and range information to allow designing a schema. Tables detail Core, Operating Environment, and Special Hardware properties.

TABLE 1

| \multicolumn{4}{c}{Core Properties} | | | |
|---|---|---|---|
| Field | Type | Range | Meaning |
| Multicore | integer | 1 to $2^{32}$ | Number of cores; application profile can indicate how many are desired |
| Performance | integer | 1 to $2^{32}$ | Relative calculation speed (maybe MFLOPS or GFLOPS) |
| Memory | integer | 1 to $2^{32}$ | Size in kilobytes (maybe megabytes) |

Note that some applications may need multicore, some may not take advantage at all, but in a VM environment, that wouldn't matter, and safety critical software may not be permitted to be execute on a node with active multicore, even if the OS isolates the software to one core.

TABLE 2

| \multicolumn{4}{c}{Operating Environment Properties} | | | |
|---|---|---|---|
| Field | Type | Range | Meaning |
| Separation Type | enum | (None, MAC Virtualization Separation Kernel) | Full node solution to isolating processes for access-control, security and crash isolation |
| Kernel | enum | (HAE, VxWorks, LynxSecure, OKL4, etc.) | Product used to provide separation, and by extension, product which cloud manager may config and control |
| Image Load Type | enum | (Local, OS Image, Executable, Tarball, LXC container) | Indicates how cloud manager can load an application to the node |
| Image Names | list<gen-image> | strings | Generic names of OS images or binaries that can be loaded on this node |
| Guest OS | enum | (LXC, VxWorks, Linux, Android, JVM, etc) | Indicates which algorithm OS images can be loaded to the node |

TABLE 3

Special Hardware Properties

| Field | Type | Range | Meaning |
|---|---|---|---|
| DSP | affinity | 0 to 1, incremental | Indicates whether the algorithm would benefit from DSP availability, or whether hardware offers DSP capability. 0 means no, 1 means necessary or available, other values indicate optional |
| GPGPU | affinity | 0 to 1, incremental | Indicates whether the algorithm would benefit from GPGPU availability, or whether hardware offers GPGPU capability |
| Min GPGPU cels | integer | 0 to $2^{32}$ | Minimum number of cels required if GPGPU is to be useful, or for hardware, number of cels available |
| Max GPGPU cels | integer | 0 to $2^{32}$ | Maximum number of cels algorithm can use, or for hardware, number of cels available |
| OpenCL version | string | 0 or x.x | Version of OpenCL supported by node |
| CUDA version | string | 0 or x.x | Version of CUDA supported by node |
| SIMD | affinity | 0 to 1, incremental | Indicates whether the algorithm would benefit from SSE or NEON style CPU single-instruction-multiple-data instruction set extensions |
| SIMD precision | list of enum | (16-bit integer, 32-bit integer, 32-bit float, 64-bit float | Precision needed for SIMD math |
| FPGA | affinity | 0 to 1, incremental | Indicates whether the algorithm would benefit from FPGA availability, or whether hardware offers FPGA programmability |
| FPGA name | string | string | |
| FPGA type | enum | (dynamic, static) | Indicates whether the FPGA is preprogrammed on the ground or can be dynamically programmed in flight |
| FPGA preprogramming | list of strings | strings | Indicates via unique names that an algorithm needs the FPGA preprogrammed to support a given named configuration (e.g. "xray-alg1-atmosphere-correction") or that hardware support such configuration |
| FPGA OpenCL support | boolean | true/false | Indicates FPGA can be programmed to support OpenCL function call acceleration |

In an example, to allow efficient virtual machine/container reuse, the hierarchical relation of tasks which include one or more applications can continue such that each application can include one or more virtual machines/containers. A virtual machine/container can be reused to produce identical virtual machines/containers, but separate instantiations. This separation of virtual machines/containers from applications allows virtual machines/containers to be replicated and reused by application developers and managed and upgraded at the same time, separately from updates to an application which includes the virtual machine/container. Tasks in the task database 902 can reference the one or more included applications, but not the virtual machine(s)/container(s). Similarly, applications can be shared among tasks rather than uniquely instantiated per task.

A first example includes two tasks, each including a single application. The single application is a distributed application having one controller and four workers, each controller and worker execute in a distinct virtual machine/container. Accordingly, five virtual machines/containers are used for each task.

In a second example, hierarchically organized applications under tasks not only allows reusable virtual machines/containers to be managed by a single authority (the software developer) and used by another (the planner), but may also be useful to the cloud manager 108 when deciding where to assign virtual machines/containers. A task profile can indicate communication and remote storage relationships between multiple applications or multiple virtual machines/containers that would be factored in the utility function in order to try to co-locate virtual machines/containers at a single client node 102 to reduce network traffic. The cloud manager 108 could similarly estimate hardware resources to be used by the virtual machine/containers so high-load virtual machines/containers can be distributed at different client nodes 102 to efficiently exploit parallel computing and reduce resource contention.

The cloud manager 108 can also include a node database 904 that describes the client nodes 102 of the network by including a profile of each client node 102. A client node profile can include one or more of the following aspect of the client node 102: its IP address, hardware resources, the services (e.g., cloud storage service 810), applications stored thereon, virtual machine/containers stored thereon, domains of the applications, and assigned Ethernet interfaces of the applications.

In a first example, the hardware resources of a client node 102 in its profile can be represented by an array of well-defined strings, so that application required or desired hardware resources are met by a client node 102 if each of the application hardware resource strings occurs among the client node's strings. The profile of a client node 102 can also indicate the relative sophistication of its hardware resource allowing, for example, discrimination between an embedded GPGPU and a high-performance GPGPU.

As discussed above, the cloud manager 108 also includes a planning module 906. In addition to providing an interface to input information and/or configuration files into the task database 902 and node database 904, the planning module 906 can read profile information from the task database 902 and node database 904 and create a plan database 908. The plan database 908 includes the plan followed by a provisioning module 910 to assign applications to a client node 102. The plan database 908 can also include network configuration information for the client managers 110 and networking devices 802. The plan can also indicate how to configure any node-located services, such as the cloud storage service 810. An administrator an input a graph that indicates the network links 101 (physical and/or wireless) between the client node 102 network interfaces and any networking devices or other nodes 104. The graph can also indicate any network links 101 between other nodes 104 and networking devices and the allowed domain of those links, if applicable.

The provisioning module 910 follows the plan in the plan database 908 by assigning applications to client nodes 102 in response to trigger events in the plan. The provisioning module 910 can communicate using message-oriented middleware with the client managers 110, cloud storage services 810, and networking devices 802. The provisioning module 910 can maintain a load/availability database 912 that is dynamically updated to reflect the current application assignment at each client node 102 as well as how the assigned applications are configured. The provisioning module 910 can also track the processor load, available memory, and/or other available hardware resources at one or more client nodes 102 and store the information in the load/availability database 912. The provisioning module 910 then uses the information in the load/available database 912 when deciding which applications to assign to which client node 102 as described above.

As discussed above, the provisioning module 910 can monitor information and store it in the load/availability database 912 to use when dynamically assigning applications to client nodes 102. The monitored information can include, but is not limited to: network interface information, client node information, and cloud service information. The network interface information can include the current domain association of network interfaces at each client node, typical average and peak network bandwidth consumed by individual virtual machines/containers, and/or current average and peak network bandwidth for each network interface at each client node 102. The client node information can include processor, memory, and data storage availability and current usage at each client node 102 and typical processor, memory, and data storage availability and usage at each client node 102. The cloud service information can include security domain association of cloud storage services 810 and other services, typical cloud storage consumption of each application, and unused storage for each cloud storage service. These numbers can be smoothed over multiple executes to improve estimates.

The cloud manager 108 can also include a request module that exposes a network-accessible API for the use of client managers 110. The client managers 110 can send information to the API, such as status changes or requests. Requests can be sent from a client manager 110 on behalf of an application executing on the corresponding client node 102. The cloud manager 108 can update the task database 902 and/or the node database 904. The provisioning module 910 can then update the application-node assignments. As an example, this can allow the client manager 110 to request a referral to a cloud storage service 810 on behalf of an application executing on the client node 102 of the client manager 110. As another example, this can allow the client manager 110 to update the cloud manager 108 on current availability and/or use of hardware resources of the corresponding client node 102.

The client manager 110 can inventory applications and network connections of a corresponding client node 102 and provide this information to the cloud manager 108. The client manager 110 can also initiate and halt applications on the corresponding client node 102 in response to instructions from the cloud manager 108. The client manager 110 can also bridge virtual machine/container network devices to physical network devices of a client node 102. At client nodes 102 where other configuration is needed, such as local storage access, the client manager 110 can handle that as well. In an example, the client manager 110 collects and maintains one or more of the following data about the corresponding client node 102: the cloud manager's IP address, the hardware resources of the client node 102, at rest application information, active (currently executing) application information, and hardware resource information. The at rest application information can include information on inactive application stored on the corresponding client node 102. This information can include required and desired hardware resources, hardware resource upper limits (e.g., on processor, memory, and/or data storage use), dynamic average/maximum use values. The active application information can include the host hardware Ethernet and virtual Ethernet device names, host bridge name, hardware dedicated (not sharable) to the application, domain(s), storage service relations (keys, local/remote). The hardware resource information can include dedicated hardware available and the idle application to which it is assigned, memory available and/or used by applications. Data storage available and/or reserved by applications. In an example, the client manager 110 does not collect and maintain data about the corresponding client node, such as when the client manager 110 is an administrator level service on the client node 102. In such an example, the client manager 110 can merely facilitate remote assignment and control of the one or more applications corresponding to the client node 102. The client manager 110 can also have a watchdog function that the cloud manager 108 can use to ensure the corresponding client node 102 is healthy.

In a first example, the cloud manager 108 can be a program deployed in a virtual machine (VM) or container (e.g., Linux container (LXC)) that can have one or more duplicates stored on distinct client nodes 102 to provide fault tolerance for the cloud manager 108. With such a duplicate, a backup cloud manager 108 could be started if the master fails.

In a second example, live cloud manager 108 backups in VMs or containers are assigned unique IP addresses and each access a single shared task database 902 and a single shared node database 904. The task database 902 and node database 904 would be backed-up to provide fault tolerance.

A live backup instance of a cloud manager 108 can be controlled so that its virtual machine or container does not bridge its IP address to the physical network address unless the backup becomes the master. Thus, the live backup instance of the cloud manager 108 can keep up-to-date with the master instance.

In a third example, the cloud manager 108 can be distributed across multiple client nodes. Multiple co-equal cloud management services can collaborate to make application-node assignment decisions and keep databases synchronized. Control messages from the cloud manager 108 can be sent from a single instance with notification sent to other instances. An election mechanism can be used by all live instances to select a designated leader to decide application-node assignments and communicate with necessary services. Alternatively, leaderless collaboration can be used with messages sent from any instances with the planning modules 906 and provisioning modules 910 predictable and synchronized.

By keeping the cloud management system focused as described herein, the developed software and its library dependencies is reduced, making the cloud management system easier to port to unique platforms. Also, the reduced code size may aid in the cloud management system being certifiable for safety and/or security.

Figure 10:
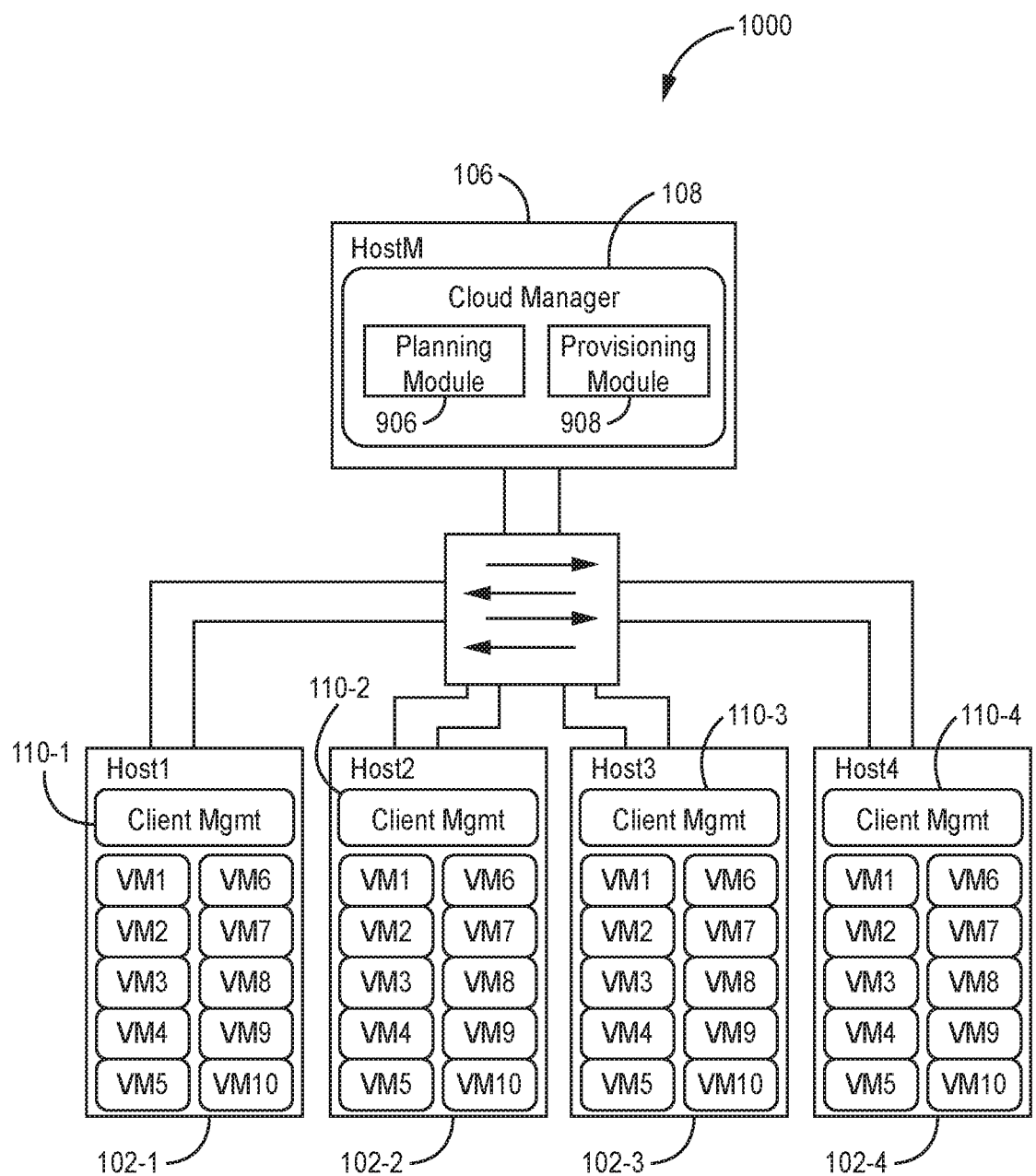
FIG. 10 is a block diagram of yet another example network implementing planned cloud management.

FIG. 10 is a block diagram of an example network 1000 implementing a cloud management system as described herein. Network 1000 includes a cloud manager node 106 executing a cloud manager 108 having a planning module 906 and a provisioning module 910. Network 1000 also includes four client nodes 102-1, 102-2, 102-3, 102-4 each executing a respective client manager 110-1, 110-2, 110-3, 110-4. A networking device 802 communicatively couples the cloud manager node 106 and the client nodes 102-1, 102-2, 102-3, 102-4 together. In this example, each application is implemented in a virtual machine (VM) on its client node 102. In other examples, however, each application can be implemented as a process or a container on its client node 102 in a similar manner.

In an example, one or more applications can be pre-loaded onto its respective client node 102 (e.g., by an administrator) prior to execution of the plan. The application(s) can be pre-loaded by being stored or otherwise embodied on the data storage medium(s) 206 of the client node 102 prior to running of the plan by the cloud manager 108. Each application can remain loaded on its respective client node 102 in an inactive state until activated by its corresponding client manager 110 in response to an instruction from the cloud manager 108. Additionally, duplicate applications can be stored on distinct client nodes 102 so that the cloud manager 108 can activate the respective application on whichever one or more of the client nodes 102 a copy of it is stored on. The cloud manager 108 can maintain a list in the profile of the application of which client nodes 102 the application is currently stored on.

In some examples, the client node 102 can dynamically provide a copy of an application to a client node 102. If a client node 102 is not pre-loaded with a copy of an application that the cloud manager 108 would like to execute on the client node 102, the cloud manager 108 can have a copy of that application sent to the client node 102. The copy of the application can be obtained from data storage on the cloud manager node 106, on another client node 102 (e.g., using the cloud storage service), or from a device external to the network 1000.

In an example, one or more of the applications themselves take responsibility for load balancing and fault tolerance in addition to the responsibility of the cloud manager 108. Such an application is written to take advantage of the distributed processing possibilities of a multi-node cloud. To implement such an application, its virtual machine/container can be stateless, receiving work from a virtual machine/container, e.g., that is acting as a sensor data gateway. A stateless virtual machine/container can be halted prematurely at one client node 102 and initiated at another client node 102 with only a small interval of unreachability to other virtual machine/container applications.

For example, a scatter-gather algorithm can be used where a dispatcher process sends "video" frames to multiple worker processes in respective virtual machines/containers for analysis. The results of each worker are returned to the dispatcher and in response to returning a result, a new video frame for analysis is dispatched to the worker sending in the result. If a result is not returned by a worker due to hardware or network failure, new data would not be sent to that worker. This provides fault tolerance for worker failures. Load balancing was a natural consequence of this dispatcher/worker relationship, because new frames are sent to workers as they completed their previous analysis, faster workers are assigned a larger share of the available analysis.

Addressing failures at virtual machines with stateful processes, such as the dispatcher virtual machine/container is more difficult. Some virtualization solutions do not support check pointing of virtual machines, which makes it difficult to move the state of a virtual machine from one client node to another. In an example, the cloud manager can implement hooks allowing applications to request halting and re-assignment to another client node 102. The cloud manager 108 could then re-analyze the client node-application assignments, possibly allowing the requesting application to be re-assigned to another client node 102 with more resources. In an example, the original and new applications directly communicate to re-establish common state at both instances before the original is made inactive. In another example, an application can include a set of one or more basic virtual machines/containers, which meet the basic requirements of the application and a set of one or more extended virtual machines/containers, which can be added by the application on request, if the application detects that its performance is falling short of expectations.

The types of decisions made autonomously by the cloud manager 108 can include other node (e.g., sensor) control and vehicle control in addition to application-client node assignment. Other node control can include autonomously changing the zoom, direction, or mode of a sensor to gather algorithm-desired data. Vehicle control can include relaying a desire to hover to track or otherwise further process a target.

Autonomous control by the cloud manager 108 can include prioritizing certain control desires of multiple sensor-data processing applications, in case those desires conflict. Vehicle control can include "sense and avoid" or collision avoidance as the top priority. In another example, the cloud manager 108 can keep a permission map and a priority map to resolve conflicting control commands from sensor-data processing applications for access control.

In an example, a portion of the autonomous decision making and control of the cloud manager 108 is implemented as a collection service, separate from the cloud manager 108. The collection service is a client node-located application, that executes on a client node 102 like any other application assigned by the cloud manager 108. The collection service has the responsibility to collect requests from other applications, process the requests into a compromise based on permissions and priorities, and issue recommendations to the cloud manager 108. An example request from another application is that an application be terminated so that its resources are freed to other applications, or that a second application be started to provide a service or data processing. The autonomous cloud management service can also collect client node 102 failure status and load, to allow reacting to over tasked client nodes 102 or hardware failures. The cloud management service can have access to cloud configuration information to aid in making decisions.

Referring back to FIG. 9, pre-mission, the cloud manager 108 can verify that the client nodes 102 are available to meet minimum needs of the known applications at each stage of a plan, where mission stages are demarcated by trigger events, such as time or location, as described herein. During the planning process the planning module 906 can flag unmet hardware needs for planned tasks. The cloud manager 108 can perform a final check before mission and present its conclusions to an administrator via the in-mission monitor and control console, to allow verifying expected hardware is present and not faulty. Pre-mission planning would include mapping every stage to available client nodes 102, so time-wise dependencies can be addressed.

In-mission (during execution of the plan), the cloud manager 108 can detect the failure of a client node 102 to start. The cloud manager 108 can then select available client nodes 102, for example by re-executing the pre-mission plan starting with the currently used nodes 102 marked as not available and attempting to optimally re-plan all remaining stages.

In an example, the process of optimally planning the application-node assignments can involve a tree analysis of applications and client nodes 102 performed by the provisioning module 910. Each tree node or the tree representing a stage with tasks at that stage mapped to various client nodes 102. The root of the tree can be the plan start state, with no client nodes 102 allocated. The root can have multiple child nodes, each child node representing one of the multiple possible mappings between the tasks of the first stage and the available client nodes 102. To simplify the tree, similar client nodes 102 may be represented as a class, so that during actual provisioning, the failure of a client node 102 in the class is easily overcome if another client node 102 of the same class is available. For each child of the root, each representing one possible stage 1 mapping, the tree building algorithm may attach multiple child nodes to represent possible mappings for the next stage. As with a chess algorithm, the goal of the tree building algorithm in the end is to produce a deep but incomplete tree, where unpromising alternatives are recognized and pruned. For instance, tree nodes can be assigned a weight to reflect fault tolerance at that stage and less tolerant children immediately pruned or not further extended for the next stage.

Pre-mission, the cloud manager 108 can find the lowest weight path (evaluating multiple weights besides fault tolerance) through the tree from root to leaf, and this would be the default application-node assignments. If tasks are dynamically added or nodes dynamically removed due to faults, child nodes, starting at the current stage, are re-evaluated and alternative paths completed and weighted so a new best path can be selected.

Figure 11:
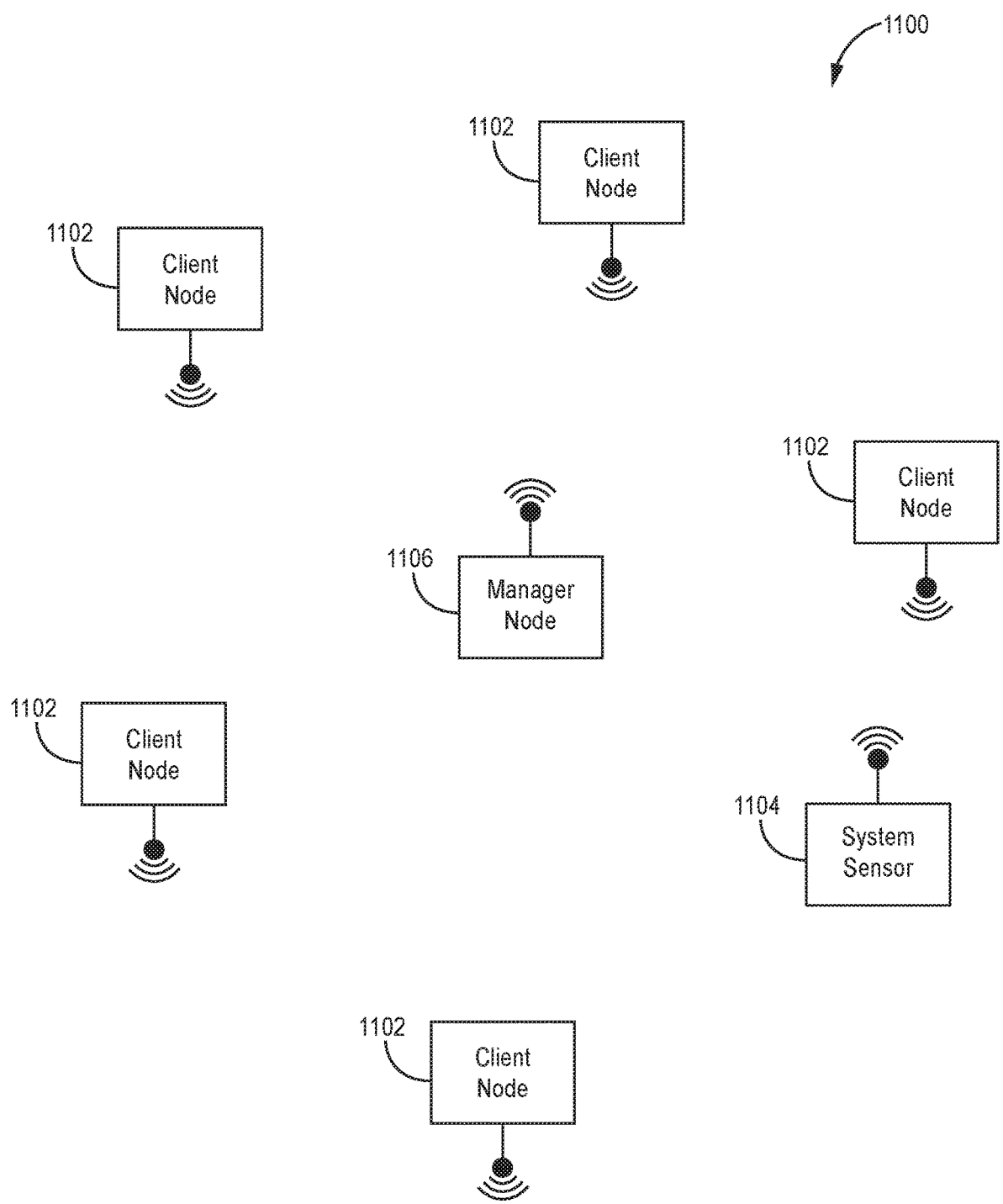
FIG. 11 is a block diagram of still another example network implementing planned cloud management in which the nodes of the network are mobile.

FIG. 11 is a block diagram of another example network 1100 implementing the planned cloud resource management described herein. Network 1100 is similar to network 100, except one or more of the nodes 1102, 1104, 1106 of network 1100 are mobile. In the example network 1100, all of the nodes 1102, 1104, 1106, are mobile. That is, each node 1102, 1104, 1106 can move independently of the other nodes 1102, 1104, 1106. The plurality of nodes 1102, 1104, 1106 are communicatively coupled together via one or more network links 101.

The plurality of individually mobile nodes 1102, 1104, 1106 are communicatively coupled together over wireless links to form the cloud network 1100. Examples of such a plurality of individually mobile nodes include a plurality of UAVs, or a plurality of personal mobile devices (e.g., phones) in an ad-hoc network. In an example, the plurality of individually mobile nodes can be communicatively coupled together in accordance with a wireless LAN (WLAN) protocol (e.g., IEEE 802.11s). Advantageously, the cloud manager 108 in such a wireless cloud network can account for nodes joining or leaving the network as it assigns applications to the plurality of mobile nodes. The network 1100 can implement the planed cloud resource management described herein to dynamically assign applications to respective client nodes 1102, among other actions.

Client nodes 1102 can be the same as client nodes 102 discussed above, except that they are mobile. Accordingly, client node 1102 are controlled by a cloud manager 108 to execute a plurality of applications on the client nodes 1102. The cloud manager 108 can also be identical to the cloud manager 108 discussed above, except the cloud manager 108 is implemented on one or more mobile nodes. In this example, the cloud manager 108 executes on a separate cloud manager node 1106. Network 1100 can also include one or more mobile or stationary non-client nodes 1104.

An example planned cloud management system as described herein is the Cloud-Based Efficient Data Analysis and Reduction (CEDAR) system described in U.S. Provisional Patent Application No. 62/329,429, which is hereby incorporated herein by reference.

What is claimed is:

1. A method of managing hardware resources of a plurality of client nodes, the method comprising:
   providing a plan that indicates when to execute a plurality of applications;
   identifying one or more concurrent applications which are one or more of the plurality of applications that are scheduled to execute concurrently according to the plan;
   generating a plurality of hypothetical execution assignments of the one or more concurrent applications to the plurality of client nodes;
   prior to executing at least one of the plurality of hypothetical execution assignments, evaluating the hypothetical execution assignments with a utility function that factors in aspects of each of the one or more concurrent applications and the hardware resources of the plurality of client nodes from a plurality of different profiles, wherein each execution assignment assigns a particular application of the one or more concurrent applications to a particular client node or particular type of client node from the plurality of client nodes; and
   instructing respective client nodes of the plurality of client nodes to execute respective applications based on the utility function.

2. The method of claim 1, wherein the utility function factors in one or more of a priority level, a minimum required resource allocation, and one or more desired types of hardware resources for the one or more applications.

3. The method of claim 2, wherein the utility function factors in the different hardware resources of each of the plurality of client nodes.

4. The method of claim 1, comprising: dynamically repeating the steps of identifying, generating, evaluating, and instructing to update which applications are executing on each client node of the plurality of client nodes over time in accordance with the plan.

5. The method of claim 4, wherein the plan indicates that one or more applications are to be added to a list of authorized application in response to one or more trigger events.

6. The method of claim 5, wherein the one or more trigger events include one or more of a specific time, a relative time, and an item of information received.

7. The method of claim 6, comprising:
receiving the item of information from an application of the plurality of applications while the application is executing on the plurality of client nodes.

8. The method of claim 4, wherein identifying one or more concurrent applications includes identifying one or more applications that are already executing and one or more applications that are not yet executing,
wherein evaluating includes evaluating premature halting of an application that is already executing.

9. The method of claim 4, comprising:
monitoring the plurality of client nodes to identify if hardware resources at any of the client nodes become unavailable for use by the plurality of applications,
wherein the utility function factors in hardware resources that have become unavailable.

10. The method of claim 4, comprising:
monitoring the plurality of client nodes to learn use of hardware resources by one or more applications executing on the plurality of client nodes; and
wherein the utility function factors in the learned use of hardware resources by the one or more applications executing on the plurality of client nodes.

11. The method of claim 1, comprising:
communicating with the plurality of client nodes over a local area network (LAN).

12. The method of claim 1, wherein instructing respective client nodes includes instructs respective client nodes to execute respective applications in accordance with the hypothetical execution assignment that maximizes the utility function.

13. A data storage entity comprising:
a non-transitory processor readable medium having software stored thereon, wherein the software, when executed by one or more processing devices:
identifies one or more concurrent applications which are one or more of a plurality of applications that are scheduled to execute concurrently according to a plan, wherein the plan indicates when to execute the plurality of applications;
generates a plurality of hypothetical execution assignments of the one or more concurrent applications to a plurality of client nodes;
prior to executing at least one of the plurality of hypothetical execution assignments, evaluates the hypothetical execution assignments with a utility function that factors in aspects of each of the one or more concurrent applications and the hardware resources of the plurality of client nodes from a plurality of different profiles, wherein each execution assignment assigns a particular application of the one or more concurrent applications to a particular client node or particular type of client node from the plurality of client nodes; and
instructs respective client nodes of the plurality of client nodes to execute respective applications based on the utility function.

14. The data storage entity of claim 13, wherein the software, when executed by one or more processing devices:
dynamically repeats the identifies, generates, evaluates, and instructs to update which applications are executing on each client node of the plurality of client nodes over time in accordance with the plan.

15. The data storage entity of claim 14, wherein identifies one or more concurrent applications includes identifies one or more applications that are already executing and one or more applications that are not yet executing,
wherein evaluates includes evaluates premature halting of an application that is already executing.

16. The data storage entity of claim 14, wherein the software, when executed by one or more processing devices:
monitors the plurality of client nodes to identify if hardware resources at any of the client nodes become unavailable for use by the plurality of applications,
wherein the utility function factors in hardware resources that have become unavailable.

17. The data storage entity of claim 14, wherein the software, when executed by one or more processing devices:
monitors the plurality of client nodes to learn use of hardware resources by one or more applications executing on the plurality of client nodes; and
wherein the utility function factors in the learned use of hardware resources by the one or more applications executing on the plurality of client nodes.

18. The method of claim 13, wherein instructs respective client nodes includes instructs respective client nodes to execute respective applications in accordance with the hypothetical execution assignment that maximizes the utility function.

19. The data storage entity of claim 18, wherein the utility function factors in one or more of a priority level, a minimum required resource allocation, and one or more desired types of hardware resources for the one or more applications.

20. The data storage entity of claim 19, wherein the utility function factors in the different hardware resources of each of the plurality of client nodes.

21. The data storage entity of claim 19, wherein the plan indicates that respective applications of the plurality of applications are to be execute in response to one or more trigger events,
wherein the one or more trigger events include one or more of a specific time, a relative time, and an item of information received.

22. A network of nodes comprising:
a plurality of client nodes, each client node having one or more processing devices coupled to one or more data storage devices having instructions thereon, wherein the instructions on at least some of the client nodes implement a client manager when executed on the one or more processing devices of the corresponding client node;
a cloud manager node communicatively coupled to the plurality of client nodes, the cloud manager node including one or more processing devices coupled to one or more data storage devices having instructions thereon, wherein the instructions when executed on the one or more processing devices of the client node:
identify one or more concurrent applications which are one or more of a plurality of applications that are scheduled to execute concurrently according to a plan, wherein the plan indicates when to execute the plurality of applications;

generate a plurality of hypothetical execution assignments of the one or more concurrent applications to the plurality of client nodes;

prior to executing at least one of the plurality of hypothetical execution assignments, evaluate the hypothetical execution assignments with a utility function that factors in aspects of each of the one or more concurrent applications and the hardware resources of the plurality of client nodes from a plurality of different profiles; and instruct client managers of each client node to execute respective applications in accordance with the hypothetical execution assignment that maximizes the utility function.

* * * * *